United States Patent
Erickson

(10) Patent No.: US 7,647,642 B2
(45) Date of Patent: *Jan. 12, 2010

(54) SYSTEM AND METHOD FOR MANAGING COPYRIGHTED ELECTRONIC MEDIA

(75) Inventor: John S. Erickson, Norwich, VT (US)

(73) Assignee: The Trustees of Dartmouth College, Hanover, NH (US)

( * ) Notice: Subject to any disclaimer, the term of this patent is extended or adjusted under 35 U.S.C. 154(b) by 763 days.

This patent is subject to a terminal disclaimer.

(21) Appl. No.: 10/925,432

(22) Filed: Aug. 25, 2004

(65) Prior Publication Data

US 2005/0039000 A1 Feb. 17, 2005

Related U.S. Application Data

(63) Continuation of application No. 09/585,727, filed on May 31, 2000, now Pat. No. 6,807,534, which is a continuation-in-part of application No. 08/731,291, filed on Oct. 11, 1996, now Pat. No. 7,047,241, which is a continuation-in-part of application No. 08/543,161, filed on Oct. 13, 1995, now Pat. No. 5,765,152.

(51) Int. Cl.
H04L 9/32 (2006.01)

(52) U.S. Cl. ............ 726/27; 726/31; 380/201; 380/285; 705/51; 705/59; 713/153; 713/176

(58) Field of Classification Search ............ 705/57, 705/51, 59; 713/155, 164, 153, 176; 726/27, 726/31, 32; 380/201, 285
See application file for complete search history.

(56) References Cited

U.S. PATENT DOCUMENTS

| | | | | |
|---|---|---|---|---|
| 4,658,093 A | * | 4/1987 | Hellman | 705/52 |
| 4,888,798 A | * | 12/1989 | Earnest | 705/54 |
| 5,023,907 A | * | 6/1991 | Johnson et al. | 710/200 |
| 5,343,527 A | | 8/1994 | Moore | |
| 5,495,607 A | | 2/1996 | Pisello et al. | |
| 5,577,254 A | | 11/1996 | Gilbert | |
| 5,586,036 A | | 12/1996 | Pintsov | |

(Continued)

OTHER PUBLICATIONS

Sussman, V., "Copyright wrong?: A Fight brews over who gets to own the future", U.S. News & World Report, Sept. 1995, p. 99, vol. 119, No. 11.

(Continued)

*Primary Examiner*—Matthew B Smithers
*Assistant Examiner*—Paul Callahan

(57) ABSTRACT

Copyrighted electronic media are packaged in a secure electronic format, and registered on associated registration server, which serves to provide on-line licensing and copyright management for that media. Users are connected to the server, e.g., through a computer network or the Internet, to enable data transfers and to transact licenses to utilize the media. Packaged electronic media are typically created by an author or derivative user of the work. Once the packaged media is registered on the server, the media is made available for limited use and possible license through an authorization server. This limited use is specified within the minimum permissions data set assigned to each packaged media. Without a license, users are typically permitted to view the packaged media—through a system which unpackages the media—but cannot save or otherwise transfer the media without obtaining auxiliary permissions to do so from the authorization server. The electronic media is authenticated through digital signatures and optional encryption.

11 Claims, 16 Drawing Sheets

U.S. PATENT DOCUMENTS

| | | | |
|---|---|---|---|
| 5,590,266 A | 12/1996 | Carson et al. | |
| 5,598,524 A | 1/1997 | Johnston, Jr. et al. | |
| 5,638,443 A * | 6/1997 | Stefik et al. | 705/54 |
| 5,694,608 A | 12/1997 | Shostak | |
| 5,819,263 A | 10/1998 | Bromley et al. | |
| 5,893,910 A | 4/1999 | Martineau et al. | |
| 5,917,912 A * | 6/1999 | Ginter et al. | 713/187 |
| 6,135,646 A | 10/2000 | Kahn et al. | |
| 6,237,786 B1 | 5/2001 | Ginter et al. | |
| 6,807,534 B1 * | 10/2004 | Erickson | 705/51 |
| 7,062,468 B2 | 6/2006 | Hillegass et al. | |

OTHER PUBLICATIONS

Steinberg S., Does information want to be free?, Los Angeles Times, Aug. 31, 1995, p. 2, part D.

* cited by examiner

DOCUMENT INFO

TITLE:                              LICENSIT REV:
AUTHOR :                         MEDIA TYPE :
REGISTRY :                       CREATOR APP :
COMMENTS :

CURRENT PERMISSIONS:

( DISPLAY SOURCES )  ( REGISTRY INFO )   ( LICENSIT! )

FIG. 7

LICENSE REQUEST

REGISTRY :
PERMISSIONS REQUESTED :

( EDIT SOURCES )   ( CANCEL )   ( SUBMIT )

FIG. 7A

PERMISSIONS REQUEST EDITOR

PERMISSIONS REQUESTED :
☐ OPENING/VIEWING        ☐ SAVE
☐ MODIFY
☐ DRAG & DROP
☐ PRINTING
☐ FORMAT CHANGES ( CANCEL )                    ( OKAY )

FIG. 7B

LICENSE AGREEMENT

REGISTRY:

RIGHTS HOLDER:

AUTHORIZED LICENSEE:

PERMISSIONS GRANTED BY THIS AGREEMENT:

TERMS OF THIS AGREEMENT:

( CANCEL )   ( I HEREBY AGREE )

FIG. 7C

REGISTRY INFO

REGISTRY :

RIGHTS OWNER:

USER CLASSES AVAILABLE [ GENERAL ▽ ]

COMMENTS :

PERMISSIONS AVAILABLE FOR GENERAL :

LICENSING TERMS FOR GENERAL :

( CANCEL )   ( REQUEST PERMISSIONS )

FIG. 7D

SOURCE WORKS MANAGER

| DOCUMENT ID : | TITLE : | REGISTRY : | CLEARANCE : |
|---|---|---|---|
| SDCSDCSFZCZDC | SDCSDCSFZCZDC | SDCSDCSFZCZDC | OKAY |
| SDCSDCSFZCZDC | SDCSDCSFZCZDC | SDCSDCSFZCZDC | OKAY |
| SDCSDCSFZCZDC | SDCSDCSFZCZDC | SDCSDCSFZCZDC | FAILED |
| SDCSDCSFZCZDC | SDCSDCSFZCZDC | SDCSDCSFZCZDC | OKAY |
| SDCSDCSFZCZDC | SDCSDCSFZCZDC | SDCSDCSFZCZDC | OKAY |

REGISTRY INFO

PERMISSIONS INFO

CHECK CLEARANCES

REQUEST PERMISSIONS

FIG. 7F

| THIRD PARTY APPLICATION - ACTIONS | VIEWER AND/OR PACKAGER ACTIONS | AUTHORIZATION SERVER ACTIONS | REGISTRATION SERVER ACTIONS |
|---|---|---|---|
| DOCUMENT OPENED | | | |
| | VIEWER VIEWS DOCUMENT ATTRIBUTES, INCLUDING MINIMUM AND AUXILIARY PERMISSIONS, IF ANY | | |
| | AUTHORIZATION SERVER CONTACTED IF REQUIRED | | |
| | | COMPARE REQUESTED PERMISSIONS AND USER CLASS WITH RULE BASE | |
| | | GRANT APPROPRIATE AUXILIARY PERMISSIONS AND ISSUE ENCRYPTED CERTIFICATE | |
| VIEWER OR EDITOR OPENED FOR PACKAGED DATA TYPE | | | |
| | IF EDITING, INITIALIZE LOCAL LIST OF ACTIVE SOURCE WORKS | | |
| ATTEMPT UNAUTHORIZED ACTION | | | |
| PREPARE REQUEST FOR REQUIRED PERMISSIONS | | | |
| | CONTACT AUTHORIZATION SERVER FOR AUXILIARY PERMISSIONS | | |
| | | COMPARE REQUESTED PERMISSIONS AND USER CLASS WITH RULE BASE | |
| | | GRANT APPROPRIATE AUXILIARY PERMISSIONS AND ISSUE ENCRYPTED CERTIFICATE | |

FIG. 8A

| THIRD PARTY APPLICATION - ACTIONS | VIEWER AND/OR PACKAGER ACTIONS | AUTHORIZATION SERVER ACTIONS | REGISTRATION SERVER ACTIONS |
|---|---|---|---|
| PERFORM DESIRED ACTION | | | |
| IMPORT DOCUMENT | | | |
| | CONTACT AUTHORIZATION SERVER ON OPENING, IF REQUIRED | | |
| | ADD NEW WORK TO SOURCE WORKS LIST | | |
| TEMPT FILE SAVE | | | |
| | EXAMINE CLEARANCES (MINIMUM AND AUXILIARY PERMISSIONS) OF SOURCE WORKS | | |
| | INITIATE AUTHORIZATION REQUESTS FOR UNCLEARED WORKS | | |
| | | GRANT APPROPRIATE AUXILIARY PERMISSIONS AND ISSUE ENCRYPTED CERTIFICATE | |
| MOVE DATA TO PACKAGER | | | |
| | ASSEMBLE BASED UPON DATA TO BE SAVED | | |
| | SELECT SERVER AND GENERATE REGISTRATION REQUEST | | |
| | | | GRANT REGISTRATION REQUEST (USED FOR FINAL SIGNATURE) |
| | COMPLETE DOCUMENT PACKAGING | | |

FIG. 8B

SYSTEM AND METHOD FOR MANAGING COPYRIGHTED ELECTRONIC MEDIA

RELATED APPLICATION DATA

This application is a continuation of U.S. patent application Ser. No. 09/585,727, filed May 31, 2000, now U.S. Pat. No. 6,807,534, which is herein incorporated by reference. The Ser. No. 09/585,727 application is a continuation-in-part of U.S. patent application Ser. No. 08/731,291, filed Oct. 11, 1996, now U.S. Pat. No. 7,047,241, which is a continuation-in-part of U.S. patent application Ser. No. 08/543,161, filed Oct. 13, 1995 now U.S. Pat. No. 5,765,152. Like parent application Ser. No. 09/585,727, the present specification is copied from the '152 patent and does not include the subject matter added in the '291 CIP application.

GOVERNMENT RIGHTS

The U.S. Government has certain rights in this invention, as a consequence of government funding (NSF Grant NCR-9307548 and ARPA Grant AO-B231).

BACKGROUND OF THE INVENTION

Copyright infringement and theft has increased enormously in the computer age, particularly with respect to information data transfers through the Internet. Further, electronic email and the communication and connectivity of local and wide area networks (LANs and WANs, respectively) have facilitated unauthorized use of copyrighted materials by permitting tagging and/or enclosing of almost any electronic media, such as application software, authored text files and graphics, and musical sounds.

On-line services such as COMPUSERVE™ and AMERICA ONLINE™ do provide some measure of copyright protection by assessing on-line charges to the access of protected databases and to the download of selected files. However, there is little to prevent that on-line user from retransmitting any downloaded files to another user connected on the Internet. If the user is also connected to a network, those downloaded files are also subject to remote access from yet another unauthorized user.

The problems associated within electronic copyright infringement are well known, particularly by those parties injured by the unauthorized use of copyrighted materials. For example, the unauthorized copying of copyrighted magnetic diskettes, and the electronic email and tagging and/or enclosing of copyrighted files can result in a direct monetary loss to the owner of the copyrighted works, in addition to an unaccounted for gain for the unauthorized user. With the expansion of the Internet and other computerized networks, the aggregate amount of such losses and gains is substantial.

Even the U.S. Commerce Department recognizes that serious copyright problems exist with the burgeoning growth of electronic data transfers between networked computers and particularly through the Internet. Early in September 1995, for example, the Commerce Department issued a white paper entitled "Intellectual Property and the National Information Infrastructure." The paper highlights the need to protect copyrighted information that is resident in cyberspace, where unauthorized users can copy original works of authorship, including movies and books, by pressing a couple of keystrokes. See, V. Sussman, Copyright wrong? A fight brews over who gets to own the future (cyberspace), U.S. News & World Report, Sep. 18, 1995, v119 n11 p99(1).

In the prior art, methods have been developed to enhance copyright protection of electronic media. For example, AT&T Bell Laboratories has developed a system which makes tiny adjustments to the spacing between words so that every copy of a document utilizing the system is "unique." These electronic adjustments are detectable by computers only because they are too small for the human eye to notice. By way of another example, DIGIMARC, a company in Portland, Oreg., recently announced a system that encodes data into an image by carefully adjusting the digital representation of individual pixels. As in the AT&T system, the encoded data is not noticeable to the eye and enables some traceability of unauthorized copyright uses. See, S. Steinberg, editor of Wired Magazine, Los Angeles Times column, p2, part D, Aug. 31 (1995).

However, such systems operate only to detect unauthorized usage of copyrighted works in digital form. They do not manage the access to copyrighted works, nor do they provide any systematic way of controlling the rights to copyrighted electronic media.

More particularly, the tracing of copyright clearances to users of copyrighted electronic media in the prior art is a tedious and often impossible task. Specifically, authors and multimedia developers have had only two practical methods for protecting their copyrights of electronic works: one method is to rely upon copyright laws and international treaties to prohibit unauthorized use of the media; and the other is to encrypt the data, so that access is restricted to those users with a decryption key.

In the first method, media developers typically do nothing; or they attach a textual copyright warning—sometimes called a "watermark"—to the media. This type of "protection" ensures free access to the media, but it works only for those honest users and derivative developers who view the work and decide whether they want to license it. However, users and developers of such media cannot be sure of the authorship or integrity of the media. Authenticity is thus sometimes increased by restricting access to the media, such as through the use of a password. By way of example, a password-protected World Wide Web page provides some measure of authenticity, but also discourages the open and free propagation of the information in the media.

In the second method, media developers can utilize powerful encryption tools, readily available in the public domain, such as those tools based on the RSA public key algorithm (Rivest, Shamir, & Adleman, 1977). However, the use of encryption to protect copyrights only serves to restrict access to the information within the media, like the password described above. Moreover, after the work is decrypted on the recipient's computer, the problems of copyright heritage and permissions for derivative development and use of the media remain.

These two methods favor either the user or the owner of the media. In the first method, for example, there is no electronic protection coupled to the media; and it thus favors the free and fair use of the media at the expense of the owners' rights. On the other hand, the second method of encryption favors the owners' rights, at least to a degree. Neither method affords both fair use and ownership protection; and neither provides for automatic management of media rights, including the controlled access to media in derivative works. Further, these methods do not intervene in managing copyrights, and are beneficial only after the copyright issue becomes a problem.

It is, accordingly, one object of the invention to provide systems and methodologies to manage copyrighted electronic media, thereby solving or reducing the afore-mentioned problems.

Another object of the invention is to provide a method for maintaining an electronic bibliographic record of successive data transfers of protected electronic media.

Still another object of the invention provides systems and methods for packaging and unpackaging electronic media within an electronic container to facilitate the management of copyrighted electronic media.

These and other objects of the invention will be apparent from the description which follows.

SUMMARY OF THE INVENTION

As used herein, a "copyrighted work" means any work that is authored and protected by U.S. and international copyright laws, including, without limitation, literary works; musical works, including any accompanying words; dramatic works, including any accompanying music; pantomimes and choreographic works; pictorial, graphic, and sculptural works; motion pictures and other audiovisual works; sound recordings; and architectural works. "Electronic media" means any electronic form or digital representation of a copyrighted work, including multimedia objects, and including any form or digital representation (1) stored within computer memory, (2) resident on CD-ROM and/or magnetic disks, (3) transmitted as a digital file through email, an on-line service such as COMPUSERVE™, the World Wide Web (WWW), and/or the Internet; and (4) communicated as a digital file within or into a computer network, such as a LAN or WAN, and including any communication obtained through remote access, such as through application software like PC ANYWHERE™ and TIMBUKTU™. "DOCUMENT" means an electronic or digital file that is constructed according to the invention by packaging the electronic media into a secure document format to manage or otherwise enable the control, access, and/or licensing of the media.

The invention provides for the secure electronic copyright management and automatic identification of ownership of creative works distributed as digital or electronic media, particularly over computer networks. Briefly, one aspect of the invention provides a system which packages electronic media into a secure document format (hereinafter "DOCUMENT"), including a data container for the media and a minimum permissions data set to specify the minimum authorizations needed to view or otherwise access the media. The DOCUMENT can also include a document header, a document identifier, a source works extensions module which maintains a bibliographical history of the media, and a digital signature to authenticate the media. The DOCUMENT and the associated network-based tools, described below and constructed according to the invention, enable the attachment of minimum permissions to copyrighted works and the subsequent on-line licensing of the media.

More particularly, and in another aspect of the invention, the DOCUMENT containing the media is registered on a registration server and licensed through an authorization server. Potential licensees view the DOCUMENT through the authorizations within the minimum permissions data set, and communicate with the authorization server, if desired, to obtain a license to the media. Once licensed, the licensee can utilize the media in accord with an auxiliary permissions data set that is assigned to the DOCUMENT during the on-line licensing transaction.

Subsequent viewers and/or users of the DOCUMENT also communicate with the authorization server. Thus, in another aspect, the invention provides for the licensing of the media to creators of derivative works, i.e., those who modify an original work of authorship and who obtain authorization to do so through an augmentation in the permissions data set. As above, the modified DOCUMENT is then registered on a registration server and licensed through an authorization server. The DOCUMENT in this aspect preferably includes a sourceworks extension module which records the original and derivative authorship of the media. By retaining such information, a copyright "family tree" or electronic bibliographic record is maintained for the media. Preferably, the authorship information in the sourceworks extensions is resident as a data element within the DOCUMENT. However, the sourceworks extensions can also be maintained on or through the authorization servers, depending upon the number of servers used in the registration of derivative uses of the media.

Like the sourceworks extensions, the invention can also record any and all users who access the media. In accord with this aspect, the DOCUMENT includes a usage module which records selected information about each user who accesses the media. The selected information can include, for example, a unique address of the user, individual or company accessing or utilizing the media, or the actual identity of the user. Preferably, the user information stored in the usage module is recorded and stored only after auxiliary permissions are augmented to the minimum permissions data set; and typically, the user's identity or location is recorded in the course of the licensing transactions with the authorization server. Like the sourceworks extensions, the usage module can also be resident with the DOCUMENT, as another data element, and/or with the authorization server. In the latter case, each time a user communicates with an authorization server to license a particular media, the user's identity or location are recorded and stored therein.

Accordingly, the invention provides several advantages in the automation and tracing of copyright clearances for both the initial users and derivative developers of electronic media. Unlike the methods in the prior art—i.e., the method of relying on copyright laws and treaties to protect copyrighted works, and the method of encrypting the media through electronic keys—the DOCUMENT format and system architecture of the invention provide for (1) both fair use and ownership protection; and for (2) automatic management of media rights, including the controlled access to media in derivative works. Specifically, the system of the invention attaches certain minimum permissions to a widely-distributed version of the media packaged as a DOCUMENT, thus being generally usable for free personal use. The DOCUMENT creator or author determines these minimum permissions in the spirit of fair use, and the permissions data set are subsequently updated to an auxiliary permissions data set through on-line licensing should the user be interested in more advanced licensing or uses of the media.

In other aspects, the invention provides an encrypted electronic signature and optional data encryption, to enhance or guarantee the authenticity of the entire work, including authorship. More particularly, in other aspects, the DOCUMENT encapsulates the required data in a secure fashion using encryption; and the digital signatures are based on message digests resulting from one-way hash functions.

In still other aspects, the system of the invention utilizes client/server system architecture based upon the TCP/IP network protocol standard. Those skilled in the art will appreciate that other network protocol standards can be used without departing from the scope of the invention.

In accord with further aspects of the invention, users can unpackage or unwrap DOCUMENTs through a controlled environment, specifically from within a compatible application or program extension, i.e., a Plug-in, which can provide the requisite controls over document use.

The invention also provides a set of easy-to-use network-based tools for registering and administering copyrights of electronic creative works. In one aspect, for example, a viewing module is provided to view and edit media-packaged graphic, image, video, audio, and textual objects. This viewing module, referred to herein as a "VIEWER," is generally required for viewing and editing DOCUMENTs.

In still another aspect, a packaging module is provided to encapsulate a newly created work in a secure, digitally-formatted package—i.e., a DOCUMENT. The packaging module, referred to herein as a "PACKAGER," is particularly useful to authors, creators and publishers who seek to secure their copyrighted works and who seek to encapsulate other information with the works, such as authorship, ownership, minimum permissions, and source works extensions. Accordingly, a user of the PACKAGER can selectively package such information with the media to formulate a DOCUMENT.

In other aspects, a registration server provides registration and authorization services on a platform such as Windows NT or Unix. The registration server is used by information creators who want users of their works to easily identify ownership and potential licensing terms, and to transact and license those works on-line. The Authorization server, on the other hand, is used by information creators and users to obtain access to creative works and to license those works for their own use. Typically, in accord with another aspect, the registration server for each DOCUMENT operates as the authorization server for all subsequent licensing transactions to that DOCUMENT.

The invention provides certain other advantages over the prior art in that creators and publishers of electronic media have direct control of the copyrights they hold through the use of authorization and registration servers. Further, the invention is preferably compatible with widely accepted object technology standards, e.g., OLE and OpenDoc, to ensure compliance with the widest possible range of applications and on several platforms.

The invention also provides for automated and controlled network-based copyright management. The registration server can be scaled to fit the needs of any authorization and registration service, from single-author shops to massive centralized clearinghouses.

In still another aspect, the VIEWER provides a mechanism for users to gain access to copyrighted DOCUMENTs. Specifically, the VIEWER in this aspect ensures that operations performed on media-packaged data objects are in compliance with the permissions that have been granted to the user.

In other aspects, a user can transact a license to the DOCUMENT through the VIEWER and the on-line communications with the authorization server. More particularly, the VIEWER in this aspect (i) generates a licensing request signal in response to inputs by the user, and (ii) communicates that signal to the authorization server assigned to that DOCUMENT. This request, sometimes denoted herein as a "License Request ," provides an entry point for on-line licensing of media-packaged works. In this way, a successfully licensed user can obtain auxiliary permissions to the DOCUMENT of interest, thereby extending the set of operations which the user may perform for a given work.

In still other aspects, the VIEWER operates to display selected registry information about the DOCUMENT. This display, sometimes denoted herein as the "Registry Information Display," provides information such as authorship, ownership, and the licensing terms associated with the electronic media, thereby facilitating the user's review and evaluation of the DOCUMENT prior to licensing. The registry information is preferably stored in the DOCUMENT itself, and/or at the DOCUMENT's registration server.

A record of the media source works is also available through the VIEWER, in accord with another aspect of the invention. As discussed above, the sourceworks extensions provide a bibliography of the authors of the media so that the appropriate authors are credited with their works even after the works are edited by a derivative author. The sourceworks extensions are typically available within a display—sometimes denoted herein as the "Source Works Display"—at the user's computer terminal.

In accord with other aspects of the invention, the VIEWER provides standardized tools and procedures for obtaining a certified digital identification of a DOCUMENT, and for becoming a licensed user to that DOCUMENT.

In another aspect of the invention, a PACKAGER encapsulates authorship, ownership, minimum use permissions, source works information and the associated creative works in a secure package. The PACKAGER has several aspects, including:

Through the PACKAGER, a user can display the status of permissions for each source work, obtain authorship, ownership, and licensing information from the source work's registration server, and selectively obtain auxiliary permissions as required for each source work.

The PACKAGER allows the author to check clearances for all sources of a work in progress and to engage in VIEWER-like licensing transactions to obtain or upgrade auxiliary permissions.

The PACKAGER allows the author to verify and modify the information that is encapsulated with the packaged media in a DOCUMENT.

Registration is the final step in setting up a DOCUMENT in accord with the invention; and the PACKAGER provides a registration client and procedure for registering a new creative work.

Like the VIEWER, the PACKAGER provides standardized tools and procedures for obtaining a certified digital identification and for becoming an authorized user.

In another aspect of the invention, a Software Development Kit (SDK) is provided to enable developers of multimedia applications, games, or multimedia authoring tools (including applications for content creation) to incorporate VIEWER and PACKAGER functionality into their applications.

The invention thus facilitates the management of copyrighted works and ensures that the media packaged within a DOCUMENT is authentic. The invention further enables the packaging of useful and selective information with the creative work, such as document identification, ownership, permissions, and sourceworks extensions. These features are provided, at least in part, by the VIEWER, PACKAGER and registration/authorization server. Through the registration server, for example, information providers of any size can take advantage of rights management for their creative works, and users on a network connected to the server enjoy easy and secure on-line licensing of the works managed therein.

In accord with a preferred aspect of the invention, the VIEWER and PACKAGER do not impose perceivable overhead during the course of normal rendering or editing of the work. The execution of VIEWER and PACKAGER functionality is quick to ensure that network functions have good performance within the available network bandwidth.

In still other aspects of the invention, VIEWER, PACKAGER, Registration Server Modules and Authorization Server Modules are operable on Win95, Windows NT, MacOS and Unix-based platforms.

In other aspects, the VIEWER and PACKAGER of the invention operate in conjunction with OLE and OpenDoc.

The invention also provides a system for authorizing access to copyrighted electronic media. An authorization server is connected for data transfer between an internal memory and at least one external data processor, and an internal storage stores selected information about the electronic media, e.g., the licensing terms for gaining auxiliary permissions to the media, the copyright ownership of the media, and revenue estimates about the media. A relay section that is responsive to a request signal by the data processor communicates the selected information to the data processor. A data comparison section receives response signals from the data processor and compares the selected information with the response signals. In this way, the data comparison section generates an acceptance signal when the response signals correspond to at least a part of the selected information, and communicates the acceptance signal to the data processor to authorize access to the media.

The system can also store the media within a storage memory, in another aspect. This memory can be within a computer connected for electronic data transfer with the data processor, whereby the computer is responsive to the acceptance signal to transfer either (1) authorizations to access the media or (2) the media to the data processor.

The system preferably includes a process section for tagging an encrypted digital signature to the media, thus authenticating the media. Another section—including a source works extension module—can also be included to append a bibliographic record to the media, the bibliographic record forming a digital representation that specifies information that references each source work and access restrictions associated with the source work.

The system can further include a section for appending auxiliary permissions to the media, the auxiliary permissions forming a digital representation that specifies an authorized use of the media, such as viewing, copying or editing the media.

In yet another aspect, the system includes an access control section for withholding access authorization to a portion of the media, the access control section thus being responsive to the acceptance signal to remove access restrictions to the portion. In this way, permissions and access to copyrighted media can be provided to specified parts of a complex multimedia object, e.g., one which includes written text, graphics and sounds.

The invention further provides a system which controls selective access to electronic media. The system includes one or more servers that communicate via a data transfer link between an associated system memory containing the media and at least one external data processor. A communication section communicates content-specific permission information about the media to the data processor, the permission information specifying data processor actions which are restricted and which require augmented access privileges to perform. A storage section enables the storage of selected other information about the media; while a relay section, responsive to a request signal by the data processor, communicates the other information to the data processor. A data comparison section receives response signals from the data processor and compares the other information with the response signals, the data comparison section generating an acceptance signal when the response signals correspond to at least a part of the other information. An access section restricts data transfers between the data processor and a portion of the media, the access section being responsive to the acceptance signal to remove data transfer restrictions between the data processor and the portion within the system memory.

The communication section of this aspect can include one of (i) a stand-alone software module, (ii) a plug-in software module corresponding to an application environment that generated or modified the media, (iii) a program extension corresponding to an application environment which generated or modified the media, (iii) a software module integrated into an application environment by way of a source code library or linkable object code performing substantially similar functions.

Although other communication protocols are suitable for the invention, communication standards based upon the TCP/IP network protocol are preferred.

The invention also provides methods for authorizing data transfers of copyrighted digital media, including: affixing content-specific permission information to the media, the permission information specifying actions which are restricted and which require augmented access privileges to perform; storing selected information about the electronic media on an authorization server connected for data transfer with at least one computer; electronically communicating selected information about the media to the computer; receiving response signals from the computer and comparing the selected information with the response signals; and generating an acceptance signal when the response signals correspond to at least a part of the selected information, thereby authorizing access to the media.

The invention also provides for optional encryption of the data within the secure container. Accordingly, the methods of the invention include, for example, the step of encrypting the media through an RSA public key algorithm.

The method of this aspect can also include the step of communicating a digital representation of at least one of (i) a copyright ownership of the media, (ii) a set of licensing terms for the media for different user classifications, and (iii) revenue estimates about the media.

In another aspect of the invention, a method is provided for maintaining an electronic bibliographic record of digital media, including: opening an object container containing the digital media, the object container including a representation of the media, a data identifier of media, and data specifying minimum permissions required to access the media; editing the digital media in an application environment; and attaching the data identifier and minimum permissions data to the edited media into a source works list. The source works list provides, among other information, a bibliographic record of the authorship represented in the media.

Such a method can also include the steps of unencrypting the media, and encrypting the media after attaching the data identifier and permissions data into the source works list.

A method of the invention also includes a process for determining the authenticity of digital media, including the step of affixing an encrypted digital signature to the media. In this aspect, the DOCUMENT is authenticated by encoding a signature representing the registration of the media. By way of example, a private key is resident with the registration server which is under strict control of the system. The authenticity—in this example—is thus granted by the registration server and proven by the digital signature in the DOCUMENT. Alternatively, in another example, the private key is provided to the user of a particular application, again under the tight control of the system.

In yet another aspect, a computer network is provided for managing original works of authorship, including: a process actuation section for affixing copyright information to a binary data element corresponding to an authored media; a process actuation section for affixing minimum permission information to the data element, the permission information specifying access restrictions to the data element; a server for storing information concerning the rights to the media, the server including a control module for controlling access to the data element according to the minimum permission information by restricting data transfers between the server and one or more computers networked with the server; a process section for tagging the data element with supplemental information; and a process section for maintaining copyright information through derivative uses of data element throughout the network.

The invention also provides a PACKAGER, which is a system for packaging electronic media within a secure electronic container. The PACKAGER includes a first process section for attaching a data identifier to the media; and a second process section for attaching minimum permissions data to the encrypted media, the minimum permissions data specifying minimum acceptance terms required to electronically access the media.

In other aspects, the PACKAGER includes a process actuation section for attaching a digital signature to the media, the digital signature providing an authentication to the media; and a process actuation section for affixing source works extensions to the media, the source works extensions specifying a bibliographic record of the media. This bibliographic record is a digital representation that specifies bibliographic information about the authors and minimum permissions of the media, thereby providing persistence through generations of derivative use of the media.

A VIEWER system is also provided for unpackaging electronic media configured within a secure electronic container. A first process actuation section recognizing permissions data attached to the media, the permissions data specifying one or more authorizations needed to electronically access the media; and a second process actuation section opens the media when a user has the authorizations corresponding to the permissions data.

In other aspects, the system includes a communication section that engages an authorization server when the user does not have the requisite minimum authorizations of the permissions data set; or when a user desires to augment the permissions to a particular media by transacting a license to that media. The communication section thus includes a process section for transmitting transactional information to the server, and for receiving, from the server, auxiliary permission to utilize the media.

The methods of the invention can include the steps of encrypting the media, and/or transferring the container to the data processor via one of point-to-point email, CD-ROM, ftp, gopher, smtp (email), and http (World Wide Web). In one aspect of the invention, for example, the registration server first authorizes a user with a PACKAGER through log-in process to establish a secure line, such as known in the art. The user and PACKAGER then generate the registration information relating to the particular DOCUMENT, and transmit the information and a message digest to the registration server. Upon receipt, the registration server returns a "registration certificate," in digital form, that is signed by the server's private key. The registration server's public key is widely known, so that the registration server can operate as a certification authority for the packaged-media. The registration certificate is then passed through secure channels, and the PACKAGER attaches the digital signature to the DOCU-MENT. Accordingly, authenticity is demonstrated to anyone with a VIEWER or PACKAGER that has access to the DOCUMENT.

In an alternative aspect, if the communication channel is unsecured, the registration certificate is encrypted via public key to the user's public key.

These and other aspects and advantages of the invention are evident in the description which follows and in the accompanying drawings.

BRIEF DESCRIPTION OF THE DRAWINGS

FIG. 8 illustrates one acceptable process flow for providing copyright management according to the invention.

DETAILED DESCRIPTION OF THE INVENTION

Figure 1:
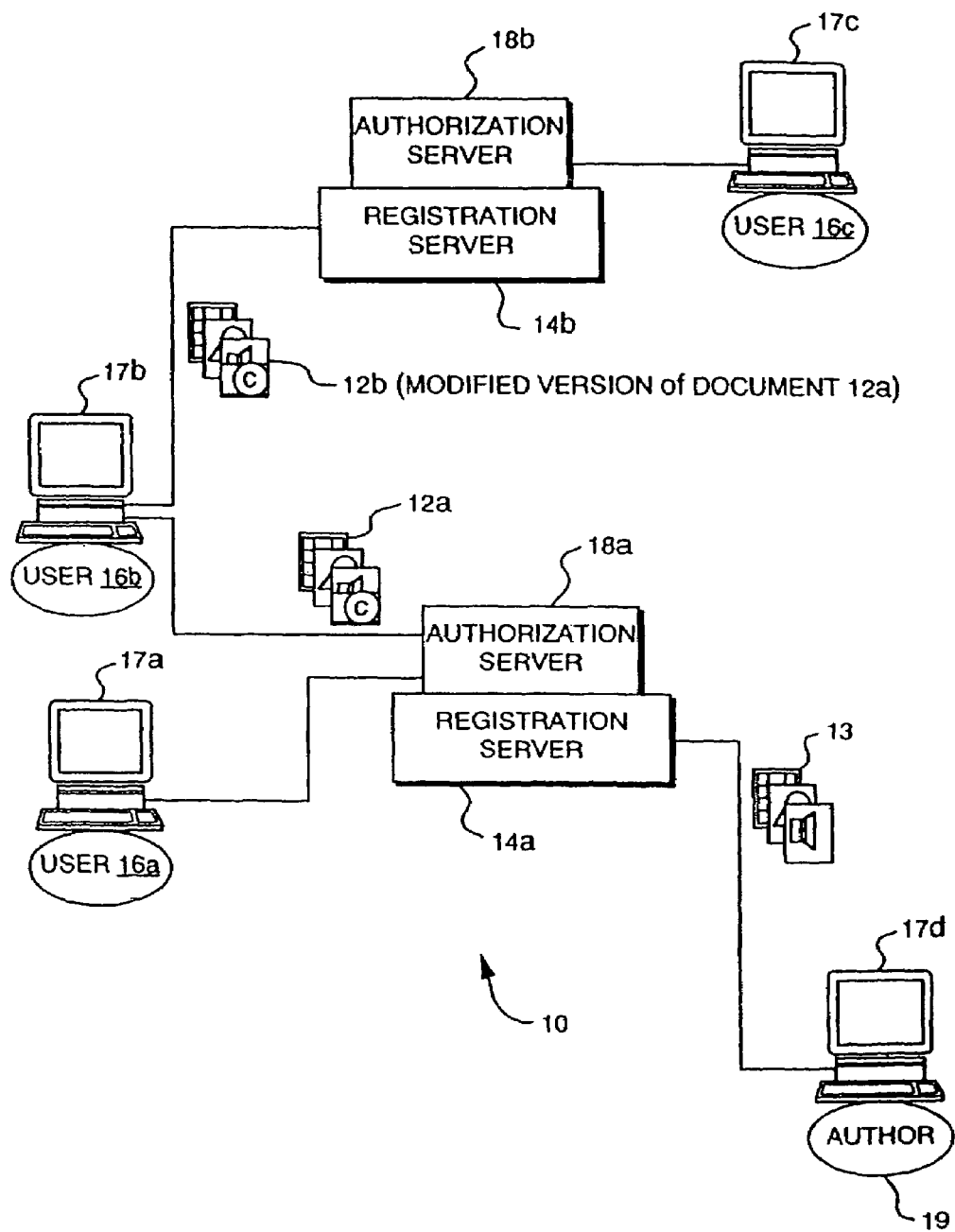
FIG. 1 illustrates one system, constructed according to the invention, for managing copyrighted works formed as DOCUMENTs.
Figure 1A:
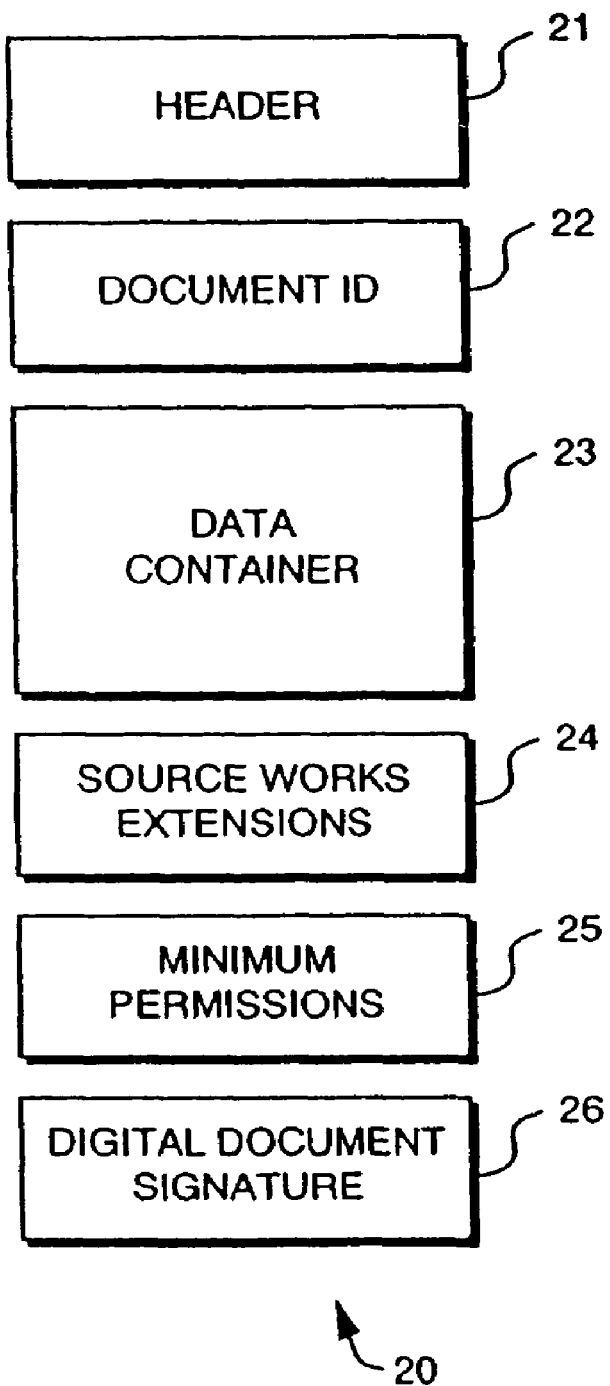
FIG. 1A illustrates a schematic view of one DOCUMENT constructed according to the invention.

FIG. 1A illustrates a system 10, constructed according to the invention, whereby DOCUMENTs 12a, 12b are created and packaged, and then registered on associated registration servers 14a, 14b, respectively. Users 16a, 16b and 16c are connected for data transfers with one or more of the authorization servers 18a, 18b, such as through a computer network or the Internet.

The illustrated DOCUMENTs 12a, and 12b are created as copyrighted media by author 19 and user 16a, a derivative author of the work 12a. For example, media 13 is representative of original work of authorship. Thereafter, the DOCU-MENTs 12a, 12b are packaged as a data container, according to the systems and methods described herein, and as denoted by the copyrighted .COPYRGT. symbol marked over the media. These packaged DOCUMENTs 12a, 12b are registered on servers 14a, 14b, respectively, and are made available for license through authorization servers 18a, 18b. A single server can operate as both the registration server and authorization server.

In operation, the DOCUMENTs 12a, 12b are available for limited free use according to the minimum permissions data set assigned to each DOCUMENT. Typically, the minimum permissions allow users with access to the DOCUMENT to view the DOCUMENT, but not to save or otherwise transfer the DOCUMENT without first obtaining auxiliary permission from the DOCUMENT's authorization server. As illustrated, for example, users 16a, 16b each have access to DOCUMENT 12a and may therefore freely read or view the contents of the media within DOCUMENT 12a at their associated personal computers 17a, 17b, respectively. If, however, the users 16a, 16b attempt to act on the DOCUMENT 12a in a manner which is not in accordance with the permissions they hold, they are automatically prompted to obtain a license to the DOCUMENT 12a. The licensing transaction occurs through the authorization server 18a, which connects and communicates with the users 16a, 16b through personal computers 17a, 17b. Alternatively, the users 16a, 16b may, if desired, initiate a licensing transaction with the server 18a if they know, for example, that their permissions are insufficient to access the DOCUMENT 12a in the desired way.

Once licensed to the DOCUMENT 12a, the licensed user has augmented auxiliary permissions to utilize the DOCUMENT in some other way, such as saving and/or modifying the DOCUMENT. Similarly, user 16c is connected via computer 17c to the authorization server 18b, and may therefore view and, if desired, license DOCUMENT 12b through server 18b. The format of DOCUMENTs 12a, 12b are described in more detail in connection with FIG. 1A.

DOCUMENT 20 of FIG. 1A provides a secure container for electronic media, including heterogeneous multimedia data types such as musical scores coupled with graphical images. More particularly, the DOCUMENT 20 provides a package that encapsulates binary data objects, shown as the data container 23, and can contain some or all of the illustrated data components 21, 22, 24, 25 and 26.

In FIG. 1A, the Document Header 21 contains basic information about the DOCUMENT 20, including, without limitation, information such as a unique file format identifier, a format revision code, a document creator application type, a file type (typically the MIME type code) of the enclosed data, a comment field length, and a comment field, typically up to about 256 characters. The information within Document Header 21 is generally not encrypted.

The Document Identifier 22 uniquely identifies the DOCUMENT 20 by the registration server upon which the DOCUMENT has been registered, and the DOCUMENT's registration or index number on that server. This registration code typically contains the server name and registration index. A registration server cross-reference table, working in conjunction with the Internet's Domain Name Service (DNS), is used to find the actual network address (typically a TCP/IP address) of the registration server. In one example, a unique server code may indicate local registration, usually indicating a work in progress. In another example, an author logged onto a computer, such as the author 20 of FIG. 1, and actively generating a copyright work in progress, e.g., a novel in Microsoft Word™, will update and store the work on the local computer. In one embodiment of the invention, a work in progress is a locally accessible file which has not been authenticated through the registration process.

The Data Container 23 contains the information representing the electronic media, typically in an original file format. If desired by the author, this data can be secured through encryption, such as through secret or public key methods known in the art. The data within the Container 23 can also be passed in the clear, i.e., unencrypted; but this reduces the control of the associated media. The fields within the Data Container 23 can include the enclosed data file, and can include the data container extension code, and the data container size, among other information.

The Source Works Extensions 24 provides a bibliographic record, or 'persistence,' of copyright uses through generations of derivative work. The data fields within the Sources Works Extensions 24 can include any of the Source Works Extension Code, the Document ID, and the Permissions mask. If demanded by the licensor of the work, or desired by the licensee, the Document ID and the applicable permissions mask (the set of relevant use permissions) for the source work are included in the derivative work. In accord with the preferred use of the invention, the Source Works Extensions 24 are encrypted; and any number of Source Works Extensions 24 may be included in a DOCUMENT 20. For example, information about successive derivative authors of the DOCUMENT 20 are stored sequentially as a Source Works Extension 24. By way of another example, one Source Work Extension 24 can include the release information for any performer whose image or audio likeness appears in the current DOCUMENT.

The Source Works Extensions preferably operates to protect the source works author, even at the risk of burdening the derivative author and/or developer. Authors can require that their work is included as a source works extension in a derivative work, or they can leave this choice to the editor or derivative developer. Authors can also request that their source works are not displayed. For example, they may require the derivative developer to go through the authorization process again to obtain permissions and to include information regarding the work.

The Minimum Permissions 25 includes a permissions data set that are distributed with all authentic copies of the DOCUMENT 20. These permissions affect the minimum use of the data within the Data Container 23 in cases where an on-line licensing transaction has not yet taken place. The Minimum Permissions 25 thus uphold the spirit of the fair use doctrine of copyrighted works; and the careful setting of the minimum permissions data set by the author(s) or creator(s) of the media ensures easy access and limited free use of the media up to the minimum authorized permissions set forth in the Minimum Permissions 20. This free use through minimum permissions is made possible by viewing the DOCUMENT 20 through a VIEWER, constructed according to the invention and described in more detail below, which is widely distributed to potential users of the DOCUMENT 20.

Minimum permissions 25 are superseded by auxiliary permissions which are assigned to the DOCUMENT 20 during an on-line licensing transaction. Auxiliary permissions are preferably contained in secure License Certificate documents provided by the Registration Server and encrypted to the licensee's key.

In accord with the preferred embodiment of the invention, an encrypted Digital Signature 26 is also part of the DOCUMENT 20, to facilitate authentication. While only the Signature 26 needs to be encrypted to ensure the authenticity and integrity of the DOCUMENT 20, encryption of the bulk data 23 is also preferred since this guarantees a high level of security.

Those skilled in the art will appreciate that other orderings of the information within the DOCUMENT 20 are possible, including one where the Data Container 23 is last.

In accord with the preferred embodiment of the invention, users can unpackage or unwrap the DOCUMENT 20 only through the controlled management of the copyrights associated with the DOCUMENT 20. Specifically, the DOCU- MENT 20 is viewable through a system constructed according to the invention and denoted herein as a "VIEWER." The VIEWER is available in several formats to accommodate the differing types of media contained within the DOCUMENT. By way of example, documents formatted like the DOCUMENT 20 of FIG. 1A can be opened and manipulated on compatible applications such as:

Stand-alone VIEWER applications which allow viewing of the media and of the networked licensing and registration information.

Applications which are fully OLE compliant and where the OLE2 implementations of the VIEWER and PACKAGER reside on the system.

Applications for which VIEWER extensions or plug-ins may be available, so that user's of applications such as Adobe's Photoshop.RTM., Premiere.RTM., and Acrobat.RTM. can directly interface with DOCUMENTs.

Applications with integrated kernel software encompassing VIEWER-like functionality, such as for integration into World Wide Web software like Mosaic.RTM. and Netscape.RTM.

The DOCUMENT 20 of FIG. 1A can also include information about the successive users of the DOCUMENT. For example, the Source Works Extensions 24 can have an appended data field or usage module which stores selected information about the users of the DOCUMENT. Such usage information can include, for example, the identity and/or location of the user. Alternatively, the usage information can be stored at the associated authorization server during or in connection with a licensing transaction to the DOCUMENT.

In summary, the DOCUMENT format of FIG. 1A augments the multimedia data content with supplementary information which identifies, without limitation, some or all of the following information: the source, registry, and format of the data; the copyright legacy of the data; minimum permissions to use of the data prior to on-line licensing; a digital signature to prove authenticity of the data; and a use record of the users who accessed the media.

Figure 2:
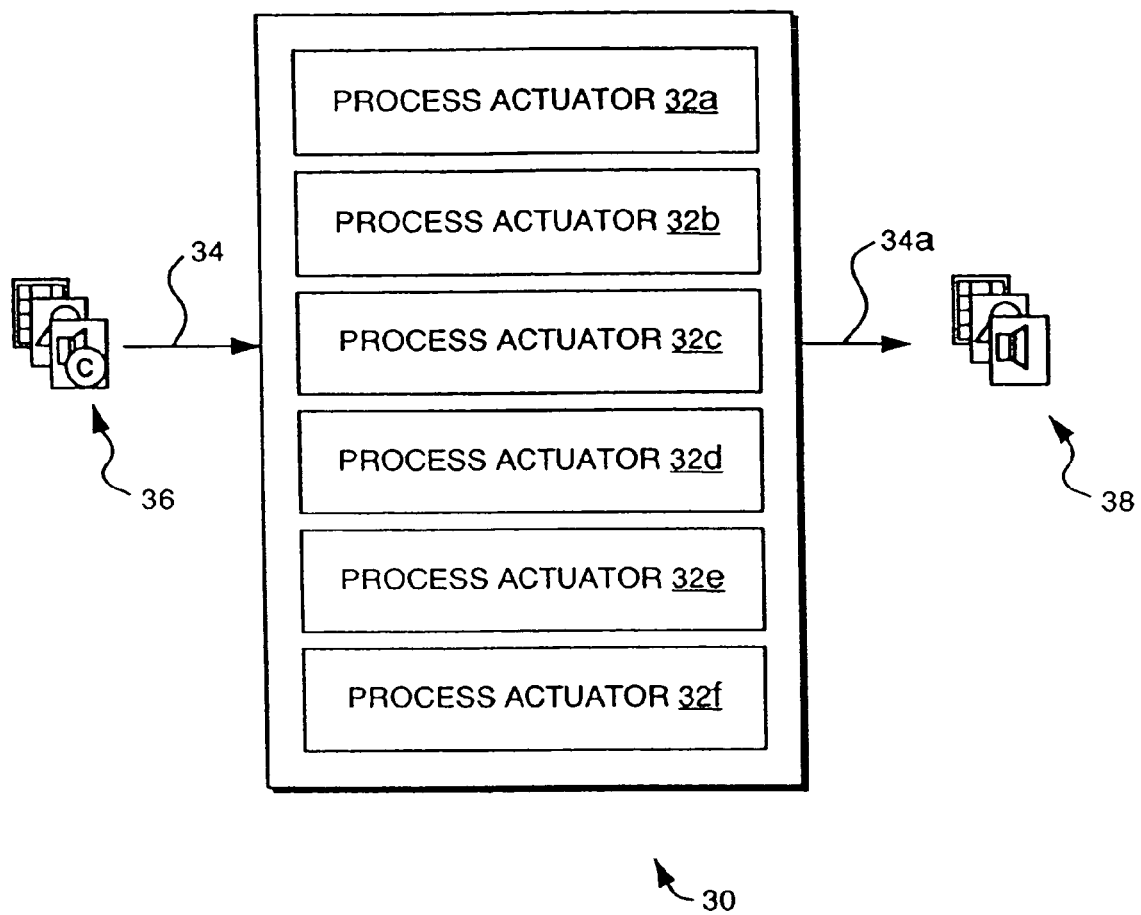
FIG. 2 shows a schematic illustration of a VIEWER system, constructed according to the invention, and which is suitable for viewing selected information within a DOCUMENT such as illustrated in FIG. 1A.

FIG. 2 illustrates a VIEWER system 30 constructed according to the invention and which is suitable for viewing the DOCUMENT 20 illustrated in FIG. 1A. The VIEWER 30 includes a series of process actuators 32a . . . 32f, each of which decodes and/or interprets the several elements of the DOCUMENT 20. The VIEWER 30 is connected for data transfer along data transfer line 34 to communicate and operate on the DOCUMENT 36, stored for example on a server. The several process actuators 32 thereafter operate, in combination, to enable viewing of the media within the DOCUMENT 36 and in accord with the minimum permissions data set. This media is illustrated in FIG. 2 as the data objects 38, which are, for example, displayed in a computer screen, through data transfer line 34a, so that a user can view the contents of the media data objects.

The VIEWER 30 can be constructed as a printed circuit board, application specific integrated circuit, a VLSI circuit, or as a software module resident within a computer and operable in connection with an internal microprocessor to perform the various process actuator functions described below in connection with process actuators 32a . . . 32f. Typically, the VIEWER 30 is connected for communication with a computer display so that once the DOCUMENT 36 is unpackaged, the data objects 38 within the DOCUMENT 36 are viewable to the user.

More particularly, the process actuator 32a interprets selected information about the document header, e.g., the header 21 shown in FIG. 1A. This information can, for example, include the type of file within the DOCUMENT 36, or a comment field specifying certain details about the media as described by the media's author. Process actuator 32b, likewise, interprets selected information about the document identifier, e.g., the identifier 22 of FIG. 1A. Such identifier information includes, at least, a unique identifier of the registration server upon which the DOCUMENT 36 is registered, so that appropriate on-line licensing transactions can occur with the appropriate location. Process actuator 32c interprets—and sometimes decrypts—the data formulating the media 38, so that the user can view the media 38 to evaluate whether to engage in a licensing transaction. The process actuator 32c provides minimum access to the media 38 in accord with the minimum permissions data set which is associated with the DOCUMENT 36 and which is loaded and interpreted by the actuator 32d. Process actuator 32e interprets selected information about the source works extensions associated with the DOCUMENT 36, while process actuator 32f interprets information about the digital signature associated with the DOCUMENT 36, thereby providing a means to authenticate the media 38.

Not all process actuators 32 are required in every VIEWER, depending upon the form of the DOCUMENT 36. At a minimum, however, the VIEWER must be able to interpret the data within the DOCUMENT, including, if necessary, decrypt algorithms needed to unlock any encrypted data within the DOCUMENT 36; and the VIEWER must identify the DOCUMENT's minimum permissions as well as the connectivity information of the DOCUMENT's associated authorization or registration server. The VIEWER will not, however, typically permit further actions—such as copying and/or downloading of the media 38 to disk—without first obtaining auxiliary licensing permissions from the associated authorization server, as described in more detail below. The VIEWER thus provides a minimum access to the data 38, such as viewing the media contents on the user's display terminal, thereby promoting limited but fair use of the data 38.

Figure 3:
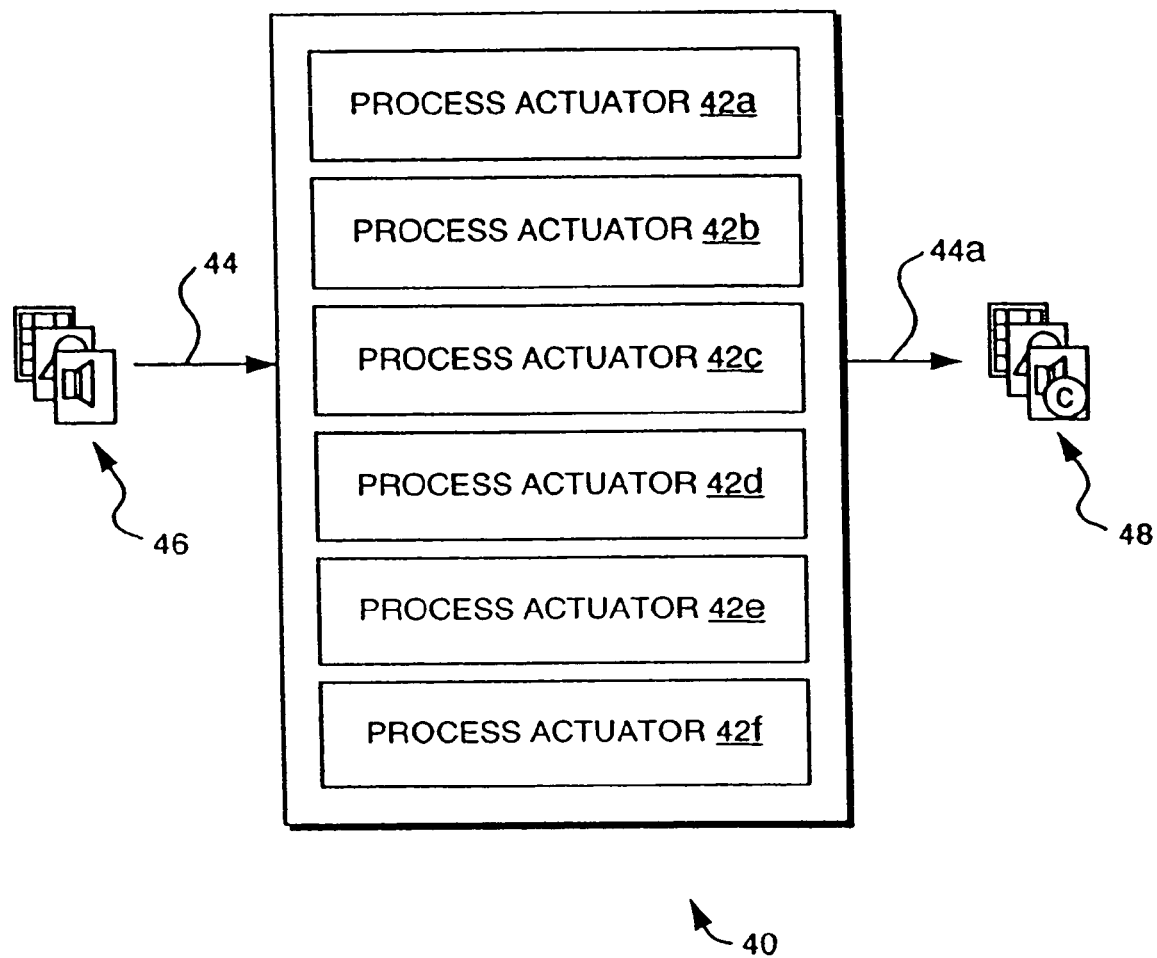
FIG. 3 shows a schematic illustration of a PACKAGER system, constructed according to the invention, and which is suitable for encapsulating electronic media within a DOCUMENT such as illustrated in FIG. 1A.

Similarly, electronic media is packaged into a format such as the DOCUMENT 20 through a packager system constructed according to the invention and denoted herein as a PACKAGER, such as illustrated in FIG. 3. The PACKAGER system 40 of FIG. 3 is suitable for generating the DOCUMENT 20 illustrated in FIG. 1A. The PACKAGER 40 includes a series of process actuators 42a . . . 42f, each of which operates to formulate one or more of the elements of the DOCUMENT 20, FIG. 1A. The PACKAGER 40 is connected for data transfer along data transfer line 44 to communicate and operate on electronic media 46. The several process actuators 42 thereafter operate in combination to package or encapsulate the media 46 into a secure DOCUMENT 48. For example, a user of the PACKAGER 40 is generally an author of copyrighted works, and one process actuator is used to specify the minimum authorized use of the media within the minimum permissions data set. The resulting packaged media, illustrated in FIG. 3 as the DOCUMENT 48, is thereafter registered on a registration server, through data transfer line 44a, so that the DOCUMENT 48 is available for on-line licensing transactions by any connected user having a VIEWER and connected to the authorization server.

By way of example, the PACKAGER 40 can be constructed as a printed circuit board, an application specific integrated circuit, a VLSI circuit, or as software module resident within a computer and operable in connection with an internal microprocessor to perform the various process actuator functions described above in connection with process actuators 42a . . . 42f. Typically, the PACKAGER 40 is connected for communication with a registration server so that once the DOCUMENT 48 is packaged, the data objects 46 within the DOCUMENT 48 are available for license by any connected user.

Sufficient information is packaged within the document format to enable a potential licensee using the VIEWER to engage in on-line licensing transactions to obtain, for example, copyright ownership, licensing, and revenue information about the data. If the terms are acceptable, the potential licensee uses the VIEWER to obtain additional permissions for derivative development or other use not covered in the minimum permissions data set. This operation is described below in connection with FIGS. 4-6.

Figure 4:
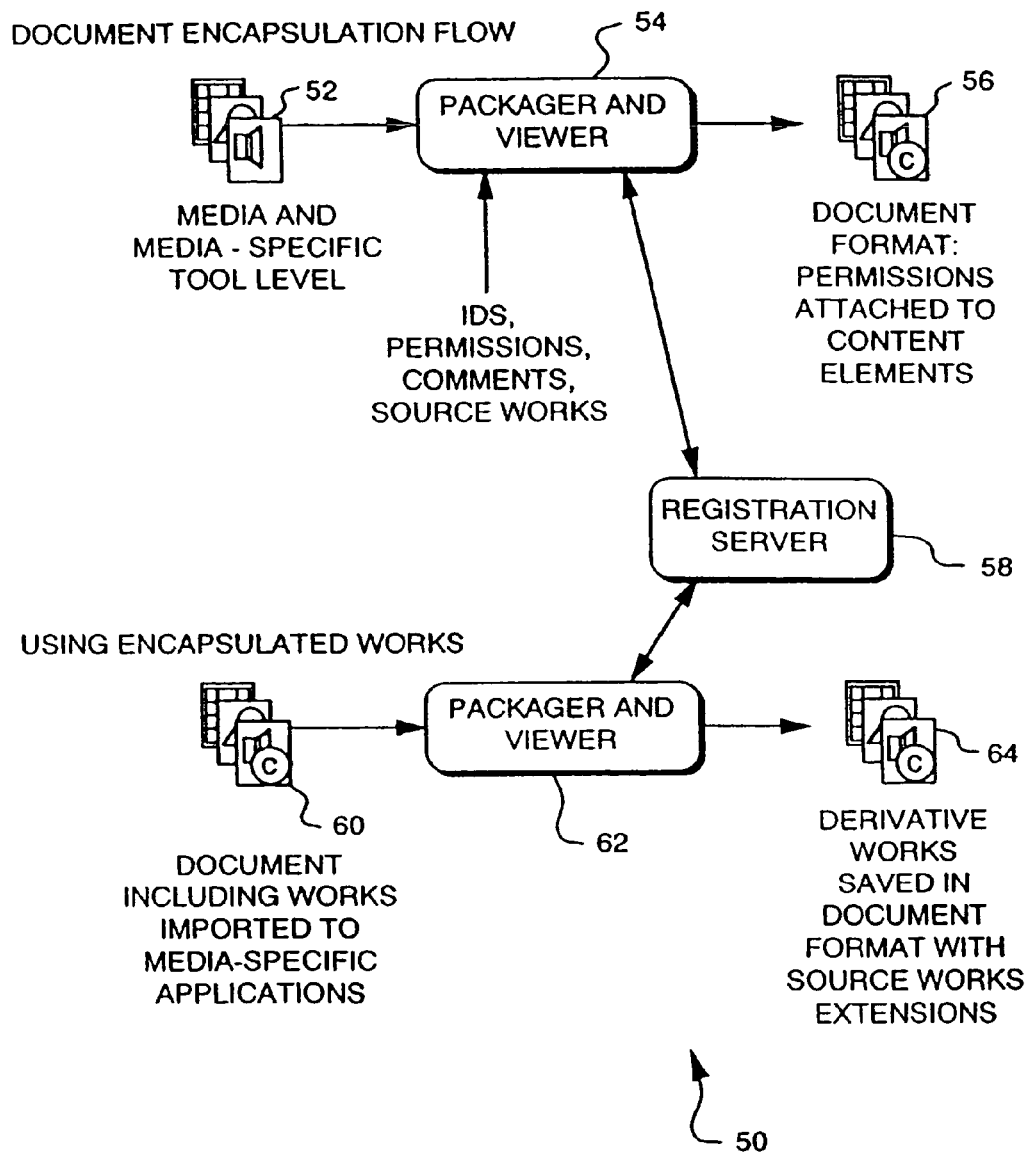
FIG. 4 illustrates a schematic diagram of a system which is constructed according to the invention and which provides for managing copyrighted electronic media assets.

FIG. 4 illustrates a copyright management system 50 constructed according to the invention. Specifically, FIG. 4 illustrates how copyright permissions will be integrated into the multimedia production environment using the described DOCUMENT format. The media is first formulated as individual content elements 52 that are created and authored by media-specific tools, such as text editors, graphics tools, audio design tools, and digital video production tools. In the conventional production environment of the prior art, the elements 52 would simply enter a multimedia asset library, ready for use in production. No copyright information whatsoever would typically be affixed to the data objects prior to archiving.

In system 50, on the other hand, content element-specific permissions are affixed to each data object 52 before passing on to the next level of production or on to archiving. In one embodiment of the invention, the system 50 incorporates a PACKAGER 54 within a stand-alone application to affix permissions and other related authorship information to the data 52, such as described in connection with FIG. 3. Alternatively, the PACKAGER 54 can be directly integrated into the media-specific tools of the developers; and, as such, the PACKAGER 54 becomes a "plug-in" tool for commercially available graphics, video, and sound development applications based on the PACKAGER software kernel.

After packaging by the PACKAGER 54, the heterogeneous content elements 56 are registered on a registration server 58, and, for example, released to the production library. During this stage of production, a multimedia authoring or scripting environment can be used to create an interactive multimedia program which is a composite of these archived elements 56. The control characteristics and asset utilization of the program embodied in the control "script" may also have an affixed permissions header. Thus all of the component assets will be protected in a similar fashion.

For derivative uses of packaged DOCUMENTS such as the packaged elements 60 of FIG. 4, a VIEWER and PACKAGER 62 can be utilized as a plug-in to the associated application software which generated the media of DOCUMENT 60 in the first place, so that editing and saving of the DOCUMENT can occur. Such modifications and saving correspond to a "derivative use," as described herein. Once the works 60 are modified and packaged into a derivative DOCUMENT 64, including a Source Works Extension, they too are registered on a registration server 58 (illustrated as a single server, for ease of illustration) for future licensing transactions, and, for example, released to a production library.

The system 50 thus provides an effective strategy for managing both in-house and externally obtained copyrighted assets. In accord with one embodiment of the invention, a two-tiered rights clearing scheme is provided for multimedia program integration, in which both the encapsulated minimum permissions and the auxiliary permissions of all incorporated works are reverified prior to compilation. The specific content of this combination of permissions, including the permissions introduced by the creator of the composite work, will dictate what sort of authorization is required at execution time. Upon remote execution of the compiled multimedia program, a spectrum of authorization schemes are possible, from free execution, to the networked authorization of individual copyrighted assets. The licensing functionality of the PACKAGER/VIEWER kernel is applicable during execution as well as during production.

Figure 5:
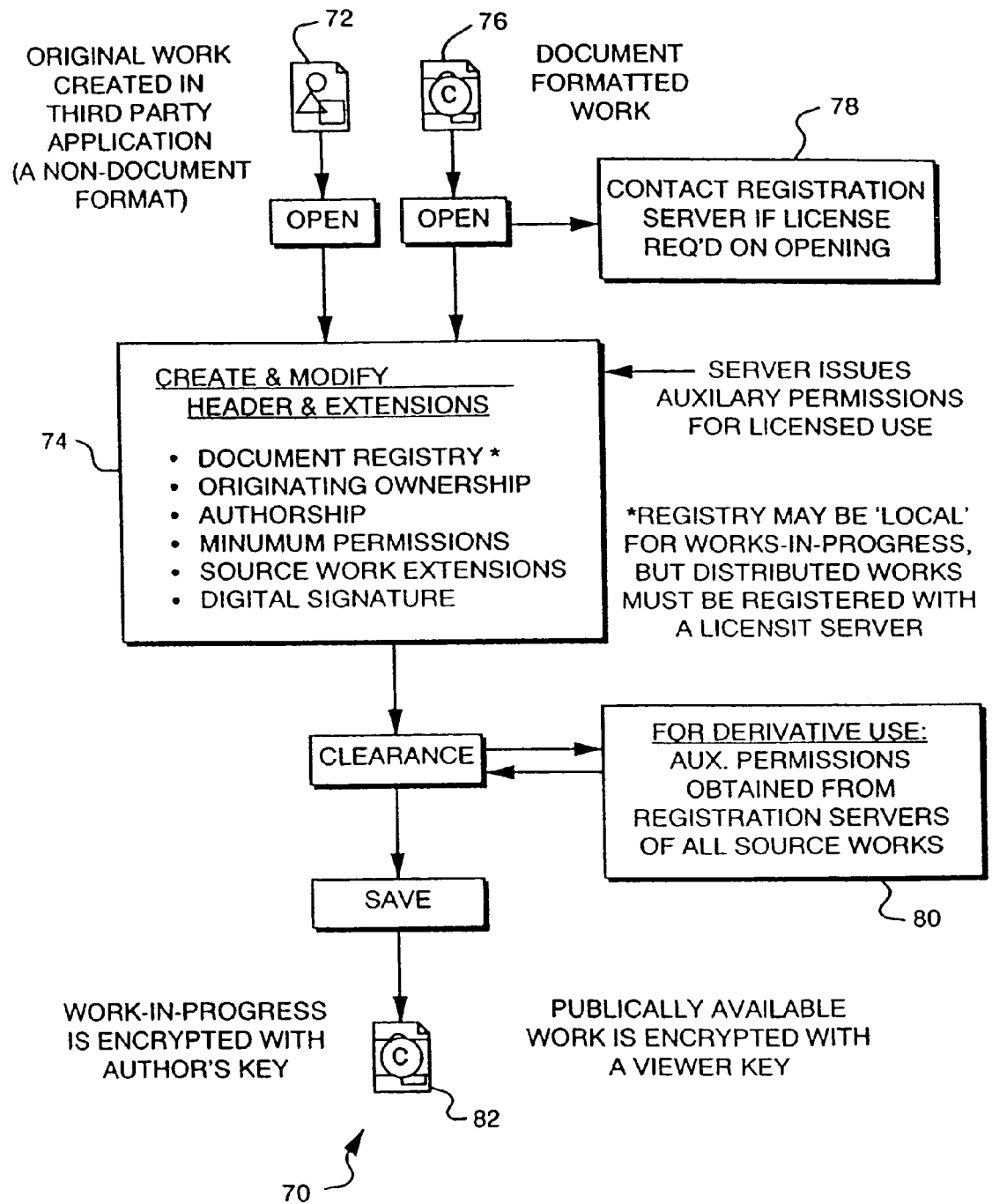
FIG. 5 shows one illustrated use of the invention in the management of copyrighted GIF files.

For illustrative purposes, FIG. 5 shows a system 70, constructed according to the invention, which only manages copyrighted GIF (graphics files) media. The GIF DOCUMENTS are created and/or modified through VIEWER and/or PACKAGER systems, such as described herein, and are managed through a registration server. FIG. 5 shows, in particular, initial document processing, use-based licensing, header and extension maintenance, source work copyright clearance, local and remote server registration, and encrypted file formatting. Preferably, the system 70 is based on TCP/IP.

The major functional sections of system 70 include opening files of appropriate types, creating and modifying headers and extensions, providing permissions clearance for included sources works and attached performance releases, and DOCUMENT formatting, encryption, and saving. Each of these sections is described below:

Opening Files

DOCUMENTS are loaded into the system 70 once packaged by a PACKAGER. For example, an original work 72 created in an application environment is opened in that environment and formatted by a PACKAGER into a DOCUMENT 74. Alternatively, an existing DOCUMENT 76 can be opened by a VIEWER, modified if desired, and stored as a DOCUMENT 74.

Figure 5A:
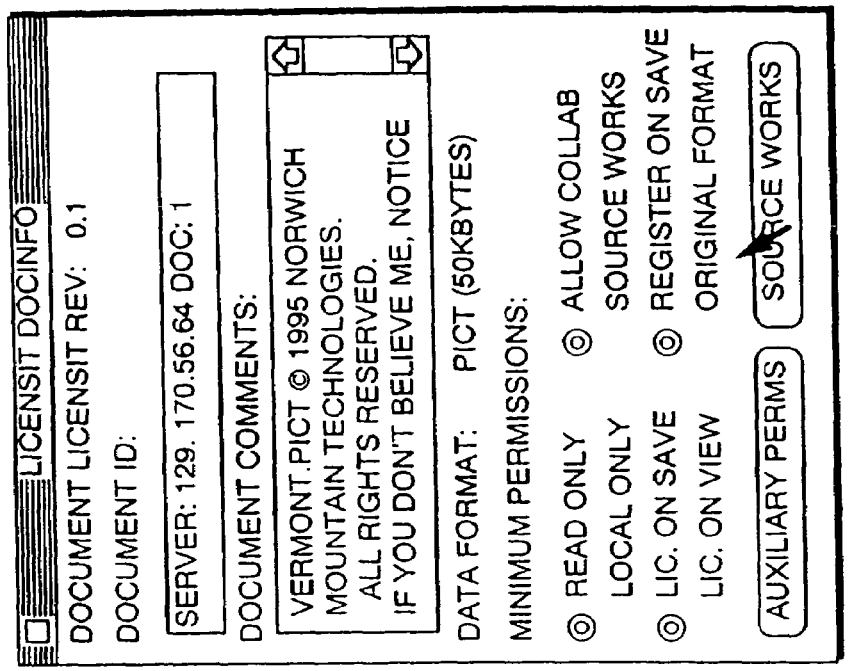
FIGS. 5a and 5b show illustrative dialog boxes displayed to a user of the system of FIG. 5.
Figure 5B:
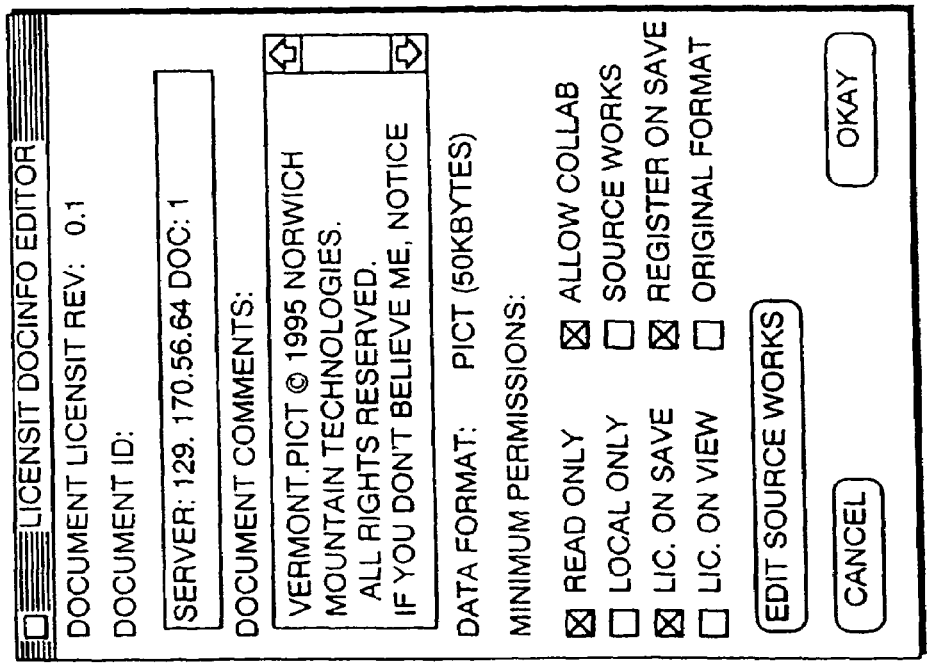

More particularly, media is opened and available to the user through a combination of the application which created the media and a VIEWER. In the case of raw GIF files, the images are displayed and a header editing dialog box appears to the creator, such as shown in FIG. 5a, indicating that the system 70 is ready to start the formatting process. For DOCUMENT-formatted files, a dialog box appears listing basic information for the main file, such as shown in FIG. 5b; and similar information is listed in a scrolling window for each of the Source Works.

The DOCUMENT's minimum permissions (obtainable and resident, for example, within any DOCUMENT) and any auxiliary permissions (obtained from an authorization server during a licensing transaction) will dictate how the opened file may be used. To encourage browsing and fair use of DOCUMENT-formatted works, the publicly distributed DOCUMENT files will typically have sufficient minimum permissions to allow local viewing, at least, and sometimes unlimited local derivative use. Publicly-distributed files which allow local viewing can be opened within the VIEWER; and files which require licensing to be opened, or working files which have not yet been publicly registered, must be opened with the user's key.

Publicly distributed files are registered on a registration server, and if encrypted, the key resident on the server is passed to the user via a secure channel. Some of these files will require licensing at viewing time, meaning that auxiliary permissions must be obtained. The auxiliary permissions files, or certificates, will be encrypted based upon the registered user's key, as are works-in-progress (not registered, and possibly with incomplete sources works clearance).

Creating & Modifying Headers & Extensions

System 70 has several interfaces for creating or modifying the headers and extensions which embody the DOCUMENT format. The Document Header, e.g., the header 21 of FIG. 1A, is primarily derived from attributes of the enclosed media within the DOCUMENT. These attributes are displayed in the DocInfo Editor and Viewer windows shown in FIG. 5a. The Document ID, e.g., the ID 22 of FIG. 1A, denotes the DOCUMENT's registration server 78 and the index number of that DOCUMENT on that server. Non-local document IDs can only be assigned if there is a valid registration certificate associated with the file. Local Document IDs are encrypted, but can only be changed by the document owner. Document ID maintenance is typically handled through a computerized dialog box.

Permissions Clearance and Source Works

For Source Works Extensions, e.g., the Extensions 24 of FIG. 1A, the Document ID information is displayed in a scrolling view for the set of source works associated with the current file. A dialog box allows the DOCUMENT IDs of additional works to be specified. Permissions information can be obtained by double-clicking an entry on this list. A transaction with the registration server 78 of the source works 72, 76 may be initiated by selecting the appropriate DOCUMENT ID. Note that the user may choose to ignore clearances for locally-generated source works.

To enable permissions clearance for source works, public registration will not be permitted without proper source works clearance. This is ensured by the following: first, system 70 will not allow on-line registration to take place unless the permissions of the included source works (plus any auxiliary permissions) agree with the intended minimum permissions and maximum licensable permissions, the latter to be set at registration time. Secondly, the registration server 78 will not allow registration unless it is proven that the source works are clear. Clearances are required for those source works extensions with insufficient minimum permissions for the intended distribution of the derivative work. These clearances are in the form of auxiliary permissions, obtained on-line with licensing transactions identical to those discussed earlier. Given the intended minimum and licensed maximum permissions, the Source Works Manager Window displays those source works whose permissions need upgrading. The user will then select each one individually to launch a licensing transaction. Clearances that are encrypted are based on the user's key, and therefore cannot be transferred.

Private works, or works-in-progress, may not require registration, but any works which are to be publicly distributed—and, for example, encrypted using a secret key—must be registered. Users must therefore demonstrate that all source works in system 70 have been cleared prior to the registration attempt. Upon successful registration, the user of system 70 will receive an encrypted registration certificate which facilitates the saving of the DOCUMENT in a publicly-viewable form. Since registration and authentication is based on a unique message digest for the file, if any changes are made to the file a new message digest must be calculated and the DOCUMENT's entry in the registration server database must be updated.

Encrypted data is preferably formatted with a secret key that is generated at the encryption event, and transported using public key encryption.

Applications compatible with system 70 are preferably based on TCP/IP, and therefore operate in the same manner as most popular Internet-compatible users.

Formatting, Encryption, & Saving

A PACKAGER of system 70 saves files in the DOCUMENT format, such as described above, and preferably encrypts the data therein. Exemplary encryption schemes according to the invention include, without limitation:

Encryption is initiated by the user, who also generates the secret key which is passed to the server, by secure means, and which becomes part of the registration record for that work. Upon the grant of auxiliary permissions, the server passes the key to the licensed user as part of the certificate. This is intended for publicly registered and distributed files, and a DOCUMENT is not encrypted in this way without being registered first.

Encryption based on the author's key. All local works-in-progress may be encrypted in this way, ensuring that local use is possible but unregistered public use is not.

Encryption based on another user's key. This permits collaboration while protecting the collaborative work.

With further reference to FIG. 5, once a DOCUMENT 74 is saved and registered on a server 78, it may be freely distributed. Derivative users 80 can gain clearance to the DOCUMENT 78 through a VIEWER in accord with the minimum permission of the DOCUMENT and the auxiliary permissions from servers of all source works. The work 82 represents either work in progress, or publicly available work; and can be encrypted, such as described herein.

Figure 6:
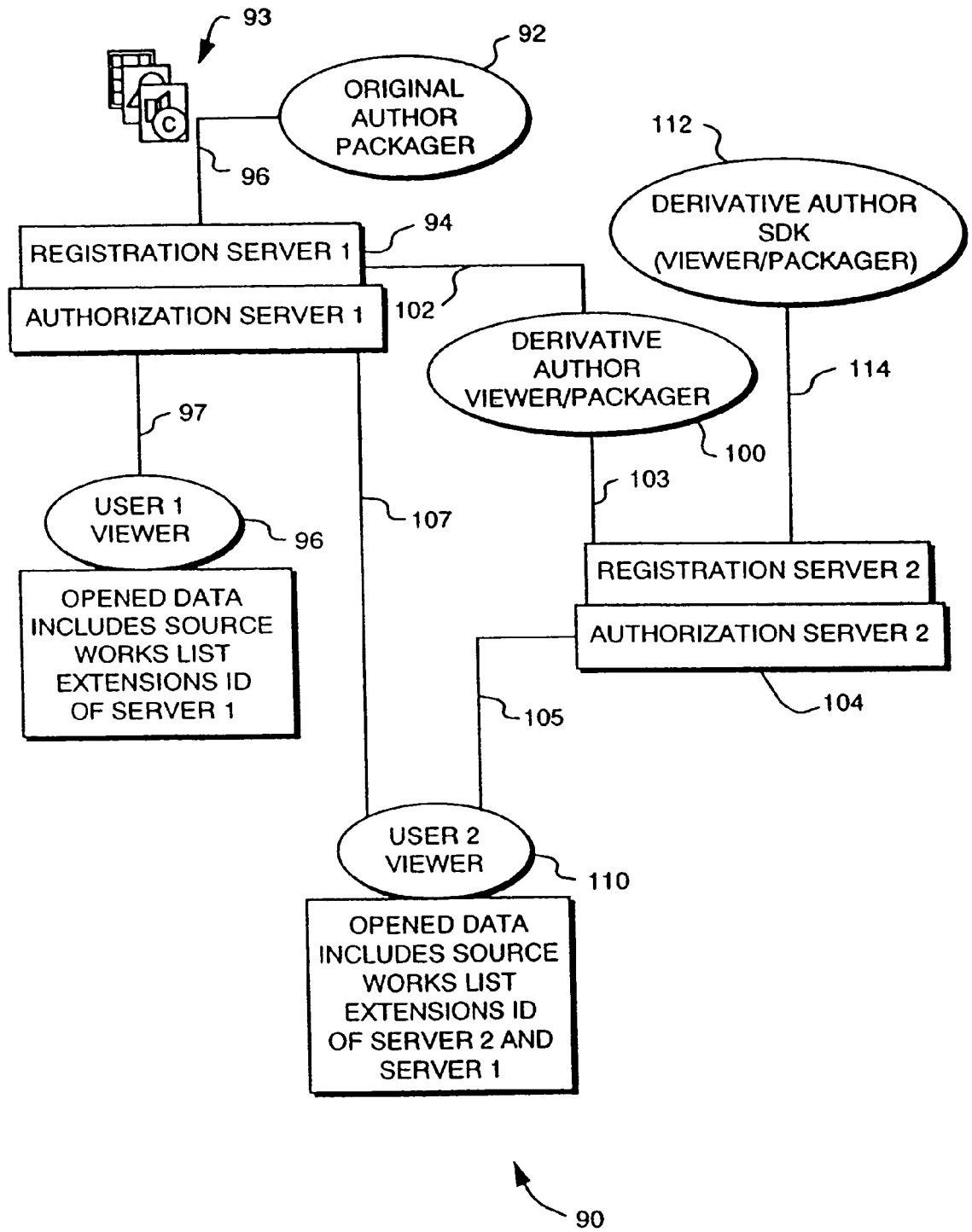
FIG. 6 shows a computer network constructed according to the invention and which illustrates selected operational uses of the invention.

FIG. 6 illustrates a computer network 90, constructed according to the invention, for managing copyrighted electronic media. In a first instance, an original author 92 generates and packages electronic media 93, e.g., such as described in connection with FIG. 3, and registers the DOCUMENT 93 on registration server 94. Typically, the author 92 generates the work 93 on a computer that is connected to the network via data transfer line 96. Once the author 92 registers the DOCUMENT 93, the server 94 becomes an authorization server for any subsequent access and/or licensing of the DOCUMENT 93.

By way of example, user 96 has a VIEWER and is connected to the network 90 through communication line 97. The user 96 can thereby access the DOCUMENT 93 through the authorization server 94 up to the minimum permissions data set forth in the DOCUMENT format. Typically, the minimum permissions permit viewing of the DOCUMENT; but do not permit saving and/or transmission of the DOCUMENT. Should the user so desire, he or she can license the DOCUMENT through an on-line licensing transaction with the authorization server 94 to obtain additional authorizations—denoted herein as auxiliary permissions—to use the media within the DOCUMENT for some other use, e.g., saving or modifying the DOCUMENT.

Similarly, a Derivative User/Author 100 of the DOCUMENT can access and modify the contents of the DOCUMENT by first obtaining auxiliary permissions to do so through the authorization server 94. More particularly, the author 100 first views the DOCUMENT via the VIEWER and through the minimum permissions data set of the DOCUMENT; then transacts a license with the Authorization server 94 to obtain the auxiliary permissions. The author 100 is thus connected via data transfer line 102 to the server 94; and has a VIEWER and PACKAGER resident at his computer (note, for illustrative purposes, the Users and Authors 96, 100 and 120 of FIG. 6 are shown with limited detail; and generally include a computer with VIEWERs and/or PACKAGERs resident at the computer).

Once the derivative user 100 modifies the DOCUMENT, the DOCUMENT is registered on registration server 104, through data transfer line 103, so that subsequent licensing can occur by users such as user 110. Note that user 110 must obtain licensing authorization from each server 104 and 94. This process is done automatically at the user's computer terminal. The user 120 first accesses the modified DOCUMENT through the network 90 and by connection with the server 104 through data transfer line 105. Once the user 110 views the modified DOCUMENT through the VIEWER, she can seek auxiliary permissions to use the data for her intended use. Such auxiliary permissions are obtained by connecting to each of the servers 94 and 104 through data transfer lines 107 and 105, respectively.

Derivative author 112, connected to the server 104 via data transfer line 114, operates a VIEWER and PACKAGER in an SDK environment. Briefly, the SDK indicates a "Software Development Kit" and enables developers of advanced multimedia applications, games, or multimedia authoring tools (including content creation applications) to incorporate Viewer and Packager functionality into their applications in advanced ways. The SDK is appropriate, for example, when conventional OLE 2.0 compliance does not deliver the functionality or performance that the ISV demands. As above, the author 112 edits and creates multimedia works and packages them through the PACKAGER resident in the SDK to provide for registration and subsequent licensing of that work.

To maintain the authorship of, and ownership to a DOCUMENT within the network 90, sourceworks extensions are used. This extension can be resident within the DOCUMENT, such as shown in FIG. 1A, so that the appropriate DOCUMENT authorship and/or ownership is recorded and stored in the appropriate data element within the DOCUMENT. Alternatively, or concurrently, the sourceworks extension is stored on any and all of the servers 94 and 104. In this way, the owner or authors of the DOCUMENT can ensure persistence through generations of derivative use. Further, use information can also be stored within the sourceworks extension, so that, for example, an owner of the server 94 or 104 can independently track the use of his or her copyrighted works simply by downloading the information at the server 94 or 104.

In general, each of the servers 94, 104 are owned and operated independently from the other. By way of example, one typical owner of the server 94 is a multimedia house which generates copyrighted works for sale and distribution. Such an owner thus seeks to restrict access to the media to authorized users, thereby protecting the copyright.

Each of the servers 94, 104 also provides selected use-base information about the DOCUMENTS registered and licensed through the servers. Specifically, the selected use-base information provides a way to assess charges to the owners of the servers for services rendered in connection with the servers 94, 104. The use-base information is available by physically accessing the server 94, 104; but is more conveniently obtained by phoning the server and downloading the information directly. This information is not available for general users; but is typically available only to the administrator who set up the servers 94, 104 in the first place. This administrator can, for example, receives fees from the respective owners of the servers 94, 104 as part of this arrangement.

For example, such an administrator would make revenue for several transactions and sales shown in FIG. 6, including: (A) registrations of DOCUMENTS on both registration servers 94, 104; (B) one licensing transaction for auxiliary permissions for user 96; (C) two licensing transactions for auxiliary permissions for user 110; (D) two PACKAGER modules resident at the computers of Author 92 and Derivative Author 100; (E) two registration modules to configure the servers 92, 104; and (F) one SDK module resident at author 112 (typically, the SDK includes both a VIEWER and PACKAGER).

Those skilled in the art should appreciate that FIG. 6 is illustrative only, and that many other configurations of a computer network are possible within the scope of the invention. For example, the network 90 can include a multitude of registration and authorization servers; and any connected computer which houses the VIEWER system can access media on the network up to the minimum permissions authorized by the minimum permissions data set within the DOCUMENT housing the respective media.

The sections below provide more detail about the invention, and include descriptive and operational commentary of the VIEWER, sourceworks information, User Registration & Certification, the PACKAGER, SDKs, registration servers, and authorization servers, among others.

VIEWERs

The VIEWER allows viewing and editing of graphic, image, video, audio, and textual objects that are packaged into a DOCUMENT in accord with the invention.

Where objects are individually packaged, viewing and editing will be done within the window of the source application or designated viewer. Where objects are content elements within a compound document, in-place viewing and editing will be common, with an external window session being optional. Data objects—i.e., media—that are packaged according to the invention can be dragged and dropped, for example, between OLE 2.0-compliant applications such that all attribute information contained in the DOCUMENT remains intact during such an operation.

The VIEWER is required for viewing and editing any DOCUMENT. The PACKAGER is the complementary to the VIEWER and is required to package media within a DOCUMENT, e.g., the DOCUMENT 20 of FIG. 1A. Typically the PACKAGER is required to create derivative works from a DOCUMENT; but only the VIEWER is required by developers when the minimum permissions of the source works do not require clearance. This might be common for so-called "public domain" free use of works.

The VIEWER examines certain attribute information encapsulated with the data object in compliance with the DOCUMENT format. Operations on the data object from within the VIEWER or editor are restricted based on the minimum permissions encapsulated with the data object and any Auxiliary Permissions subsequently obtained for the data object. By way of example, the "Document Info" window of FIG. 7 provides a local summary of the document, including all available minimum and auxiliary permissions.

The VIEWER also facilitates on-line licensing of DOCUMENT-packaged works. Based on registration information encapsulated with the data, i.e., the Document ID, the VIEWER contacts the DOCUMENT's Registration Server and initiates an authorization transaction. After the user is authenticated (typically utilizing the user's RSA digital signature, whereby the user's key is stamped by a certification authority), the user uses a template-like interface to request auxiliary permissions, such as shown in FIG. 7a. If the permissions request does not match the user's requirements, the request may be edited, such as shown in FIG. 7b. Based on the available Transaction Rules in the database for the user's classification, licensing terms are presented to the user, such as shown in FIG. 7c. If the terms are accepted, a digital certificate is issued containing the auxiliary permissions for that specific derivative use and encrypted to that specific user.

The License Request window, such as shown in FIG. 7a, is the entry point for licensing transactions. The Registration Server is identified and the set of requested permissions is displayed. If the User recently attempted an unauthorized operation, the permissions displayed are those required by that operation. The user has the option to edit the request, such as shown in FIG. 7b, to proceed with the transaction, or to cancel out. When the user has submitted the Request, a License Agreement, exemplified in FIG. 7c, is returned to a display terminal at the VIEWER. This interface, such as shown in FIG. 7c, allows the user to verify the terms of the agreement and to agree to those terms.

The VIEWER can be used to obtain extensive information about the authorship, ownership, and licensing terms of a creative work prior to any licensing transaction. This information may be a combination of data permanently encapsulated with the object, including for example authorship and basic document information, and information stored on the registration server, including for example copyright ownership, licensing terms, royalty schedules, and other augmented document Information. FIG. 7d illustrates the typical information which is available from the Registration Server and which can be displayed in a Registry Info window.

Source Works Information

Figure 7E:
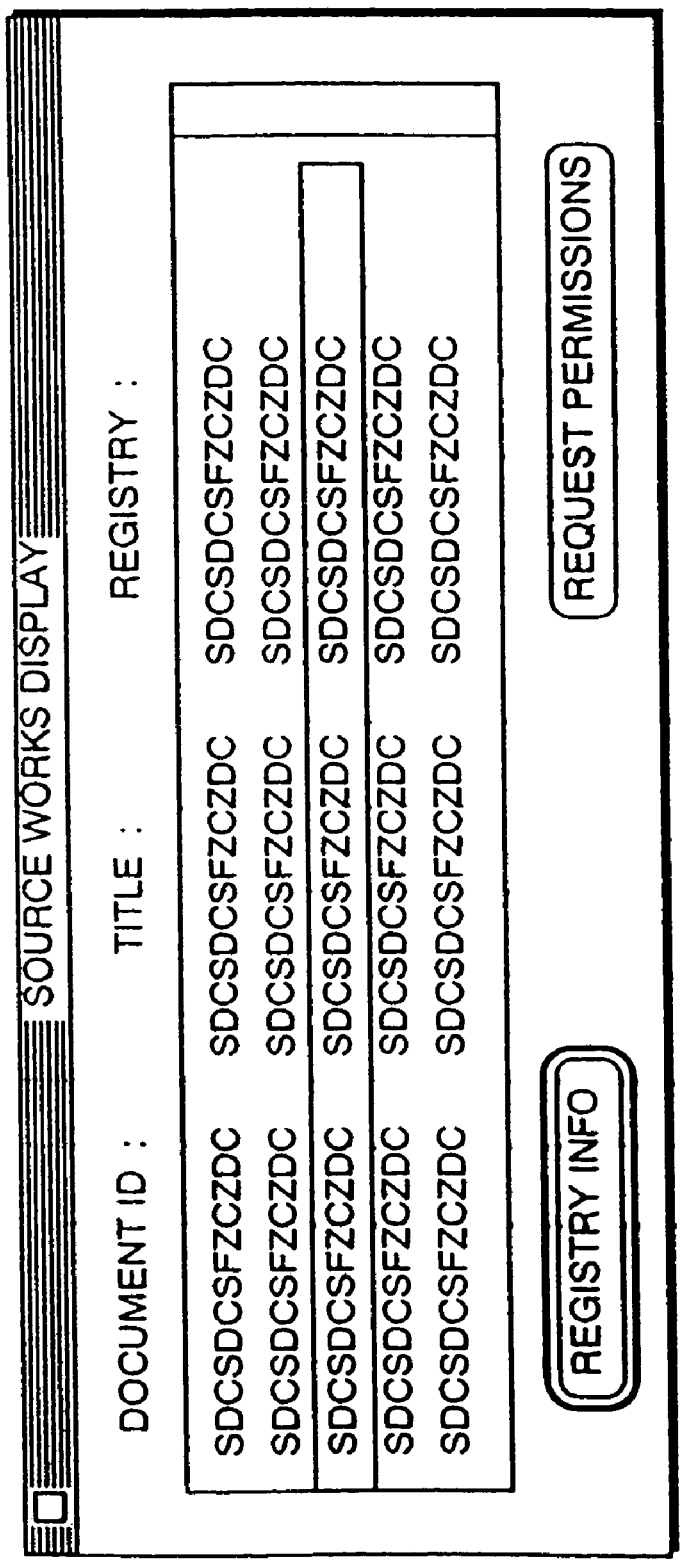
FIGS. 7-7h show illustrative computer displays for use with a system constructed according to the invention, such as the network of FIG. 6.
Figure 7G:
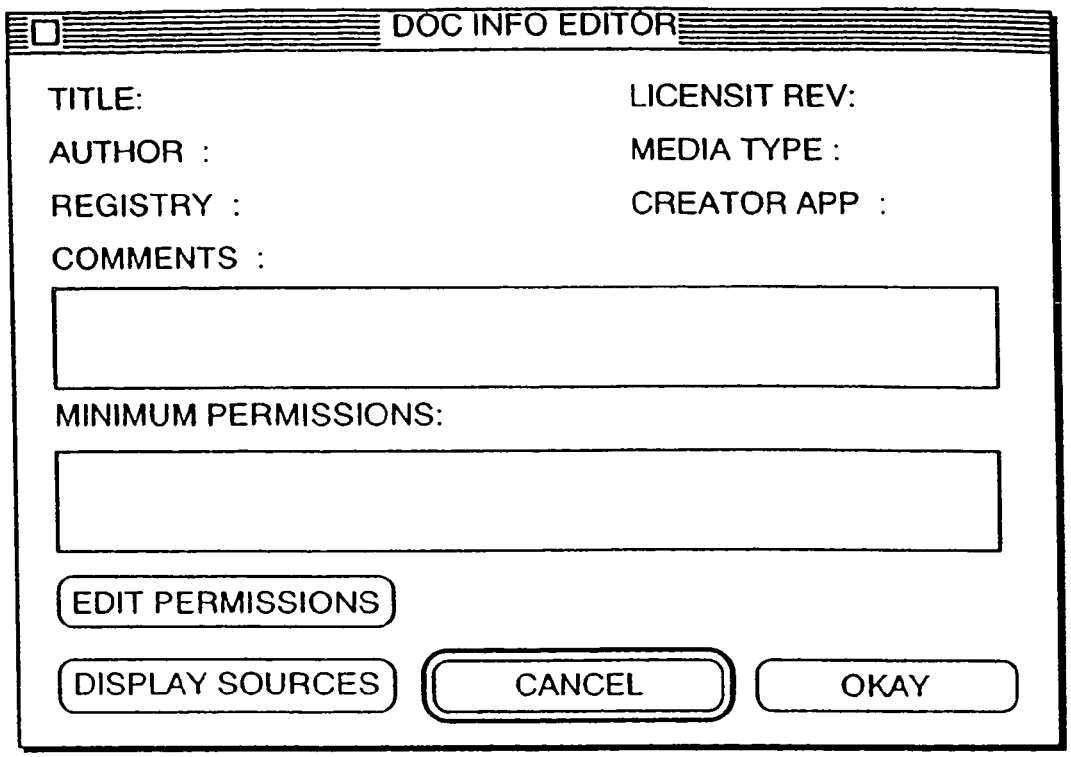
Figure 7H:
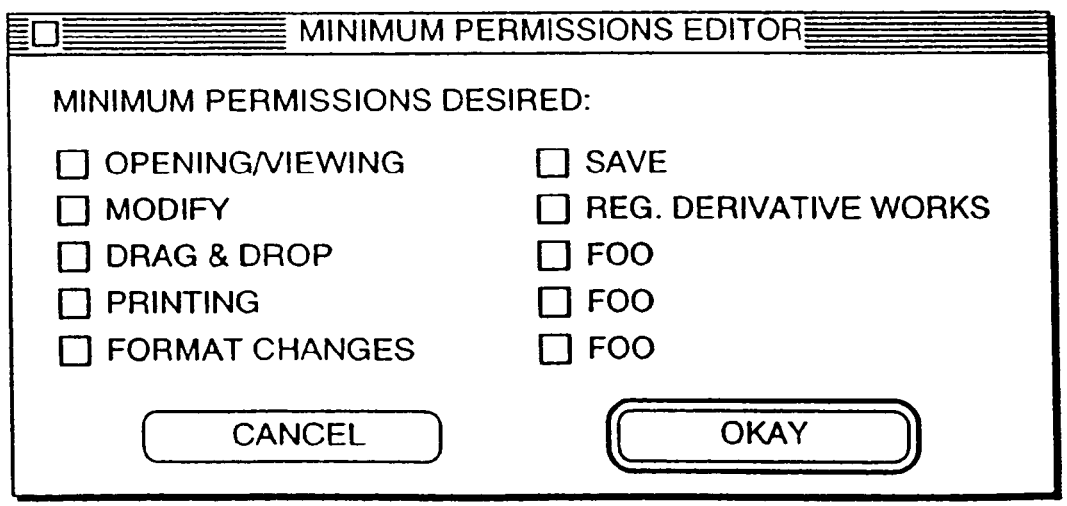

The VIEWER can also be used to obtain source works information for the media object. The Sources Works Display, for example and as shown in FIG. 7e, presents the electronic record of any work from which the current work is derived, and the available information about each of those works.

User Registration & Certification

Any user of a VIEWER or PACKAGER who wishes to engage in an on-line transaction typically presents an RSA-based, network-standard digital signature signed by a recognized Certification Authority. Both VIEWERs and PACKAGERs will thus contain RSA-based standardized procedures for creating and managing public/private key pairs, for engaging in certification transactions, and for becoming registered users. The Certification Authorities require human intervention when authenticating an individual's personal information. When valid information is received, the individual's key is stamped with a unique code from the Certification Authority which recognizes its authenticity. This certification is apparent before anything is encrypted to that key, and is apparent when the key is used to verify a digital signature (which can only have been signed by the individual using the matching key).

PACKAGER

The PACKAGER is used by authors and publishers to encapsulate authorship, ownership, minimum use permissions, and source works information with a creative work and in a secure package. During this encapsulation, the original binary file format of the creative work is preserved. An object created by the PACKAGER can stand alone, or can be incorporated in a compound multimedia DOCUMENT. The PACKAGER is required for any editing sessions which involve DOCUMENT-packaged works and which demand clearance for derivative use.

During an editing session, the PACKAGER maintains a list of all DOCUMENT-packaged source works, their minimum permissions, and any auxiliary permissions which have been granted to the current work in progress. The Source Works Manager window, such as shown in FIG. 7f, allows the developer to easily see the status of permissions for each work, to obtain detailed authorship, ownership, and licensing information from the source work's registration server, and to selectively obtain auxiliary permissions as required for each source work.

For example, the user can command the display of all DOCUMENT-packaged source works from the Source Works Manager window of FIG. 7f. For each individual source work, the user may review the minimum permissions and, if available, any auxiliary permissions which have been issued. If the user chooses to obtain auxiliary permissions or to upgrade the current set displayed, a Viewer-style licensing transaction is initiated with the source-work's registration server.

Alternately, the PACKAGER can prompt the user to upgrade the permissions. This happen during the registration process in the following way: after preparing the DOCUMENT data for the derivative work, including the requisite minimum permissions, the user executes a Check Clearance, wherein all accumulated permissions are checked against the minimum permissions which the developer intends to encapsulate with the derivative work. All sourceworks with permissions that are insufficient will be listed in the Clearance Status window.

The Check Clearances function is also applied to the set of Transaction Rules which the developer intends to load on the Registration Server. The basic principle is that a derivative work may not grant more rights to the use of a source work than what was available before the derivative work was created.

Some of the DOCUMENT information which is encapsulated with the data object by the PACKAGER is prepared from context automatically. Other information can or should be manually entered or selected by the user through the a dialog window such as the DocInfo Editor Window of FIG. 7g, such as:

(1) Revision Number: The revision number identifies a version of the document format which the PACKAGER complies with.

(2) Data Format and Creator Application: This provides the type of data contained within the DOCUMENT, and the application environment which created the DOCUMENT. Note, however, that these fields may have reduced functionality when used, for example, with OpenDoc and OLE 2.0. In such a case, the DocInfo Editor can display the information, but it does not need to be contained as a separate DocInfo field if the Object Container can be interrogated for it.

(3) Minimum Permissions: As described above, the minimum permissions template provides a way for the user to generate the minimum permissions that are encapsulated in the DOCUMENT. One acceptable set of permissions, such as shown in connection with the Minimum Permissions Editor window of FIG. 7h, includes:

Opening/Viewing restricted
Modifications restricted
Drag & Drop restricted
Printing restricted
Format Changes restricted
Saves restricted
Registration of derivative works required
Store Source Works Extensions on Registration Server
Require Source Works Extensions
Restrict Source Works Extensions (4) Source Works Extensions: The identification of source works extensions is managed by the Source Works Manager, described, in part, in connection with FIG. 7f. The author of the works can also track unregistered or non-DOCUMENT-packaged source works using the Source Works Manager, which allows authorship and ownership information to be textually entered into the Registration Server's database when the derivative work is registered. When information or authorization is requested, only contact information will be provided.

(5) Digital Signature: The Digital Signature provides authenticity and integrity of all information contained in the DOCUMENT. One secure way to do this is to attach a RSA digital signature to the DOCUMENT, which is provided by the registration server upon license. The author is a registered user in this case, and the DOCUMENT is registered on a Registration Server. Appropriate evidence of certification and the DOCUMENT's hash results are contained in the signature.

The PACKAGER can also enable encryption of the media within a DOCUMENT. If an author chooses to encrypt the media, a random key for the media is generated; and during a secure registration transaction with the registration server—such as after a log-on and once the author proves she is authorized to use the server—the secret key is passed by either (i) a secure communication channel, or (ii) a certificate that is public-key encrypted to the user's key, so that only that user may use that issuance of the secret key. This encryption method provides for strong security since secret keys are randomly generated and are unique to a DOCUMENT; and the distribution of the key to the DOCUMENT is handled by the server.

Those skilled in-the art will appreciated that other encryption methods are suitable for use with the invention and without departing from the scope of the invention.

SDKs

As discussed above, the Software Development Kit (the SDK) enables developers of advanced multimedia applications, games, or multimedia authoring tools (including content creation applications) to incorporate VIEWER and PACKAGER functionality into their applications in advanced ways. The SDK is appropriate, for example, when conventional OLE 2.0 compliance does not deliver the functionality or performance that the ISV demands.

The VIEWERs and PACKAGERs of the invention operate with most OLE 2.0-compliant content creation tools and with most tools that create compound works. The SDK permits the developers to follow their own coding standards but still take advantage of the invention.

Registration Server

The Registration Server of the invention contains the set of services used by information creators who want users of their works to be able to easily identify ownership, obtain licensing terms, and license those works on-line. The Authorization Server module is the set of services those information users (who may also be information creators) will use to obtain access to information and license those works. The Server maintains a database of registry information pertaining to creative works which rights-holders are making available for commerce.

The process of initiating a database entry for a work is called Registration. The act of processing a user's request for augmented permissions is called Authorization or licensing. Before starting a transaction with the Server, the PACKAGER does the following:

Verify that the user is a registered user. It will look for the user's RSA key with a certification stamp from an approved certification authority. Preferably, user registration capabilities are built into all VIEWERs and PACKAGERs.

Ensure that the user completes the Transaction Rule Templates, used in designing the licensing rules for all available classes of users. This should be completed prior to contacting the Server because they determine whether sufficient clearances have been obtained.

Ensures that the user completes the Ownership Information Template, which is the textual information that a user of the work would receive when using the VIEWER to obtain further ownership information, beyond what might be encapsulated in that package.

Verifies that sufficient clearances (auxiliary permissions) for all source works used in the current work-in-progress are available to the PACKAGER.

If the clearances are insufficient, the PACKAGER guides the user through the series of authorization transactions required to get the necessary permissions.

When sourceworks clearances are complete, the PACKAGER performs a one-way hash function contained, for example, in an RSA Digital Signature and which become part of the works' database record for later authentication.

As a last step, the PACKAGER contacts the Server.

The PACKAGER testifies to the Server that the user is authentic and that all sourceworks (if any) used in the work being registered have been properly cleared. The Server then assigns a unique registration ID to the DOCUMENT (based, for example, on the server's ID and the number of documents registered on the server) and builds the database record based on the information held by the PACKAGER.

In "signing" the DOCUMENT, the PACKAGER preferably assembles a RSA Digital Signature for the package. Contained within the signature are the registration ID and the results of the one-way hash on the document data. The signature is encrypted to the User's key, thus demonstrating authenticity.

Authorization Server Module

Before starting a licensing transaction with the Authorization Server, the VIEWER does the following:

Determines that available permissions (minimum and auxiliary) are not sufficient to perform the user's desired action.

Verifies that the user is a registered, which is required only if a transaction with the Server is necessary.

Testifies that the user is registered and presents the authorization request (a request for specific auxiliary permissions) to the Authorization Server. The user's classification is also transferred and stamped with certification from the associated Certification Authority.

Based on the requested auxiliary permissions and the classification of the user, the Server presents its terms for licensing. These terms are viewable within the VIEWER window and can include, without limitation, any of:

Actual Permissions Granted

Payment options. When a choice of on-line payment methods are available, a provider-specific window becomes available after the method is chosen. When some other method is required, an appropriate window to facilitate the payment is displayed.

Request human intervention. The user or the Server may not be satisfied with an on-line authorization request. In that case, the option exists to pursue some form of human intervention. The options which the registering party has made available are displayed.

Accept terms. When the licensing terms are accepted, a packet enabling the auxiliary permissions is transferred to the VIEWER. These are encrypted to the user and thus are non-transferable.

The systems and methods of the invention encompass novel methods and tools which will enable creators of networked multimedia programs to identify their media and to claim their rights. This is enabled, in part, by bundling the copyright information with the data element, and by formatting the DOCUMENT in a manner which maintains this identification and attribution so that it persists with the copyrighted work through generations of derivative use. The invention therefore demonstrates the application of copyright permissions to a hierarchy of network-distributed data objects to effectively protect owners' rights.

This invention also facilitates the licensing of multimedia content by different classes of users. In accord with the invention, a desktop tool can be integrated with selected viewing or production tools to feature an interactive licensing template.

The invention thus demonstrates the integrated support of hierarchical permissions headers in the production environment, and demonstrates networked interactive licensing within the production environment based on hierarchical permissions.

FIG. 8 illustrates one acceptable process flow for managing copyrighted works in accord with the invention and corresponding to the methods and systems described herein.

Figure 9:
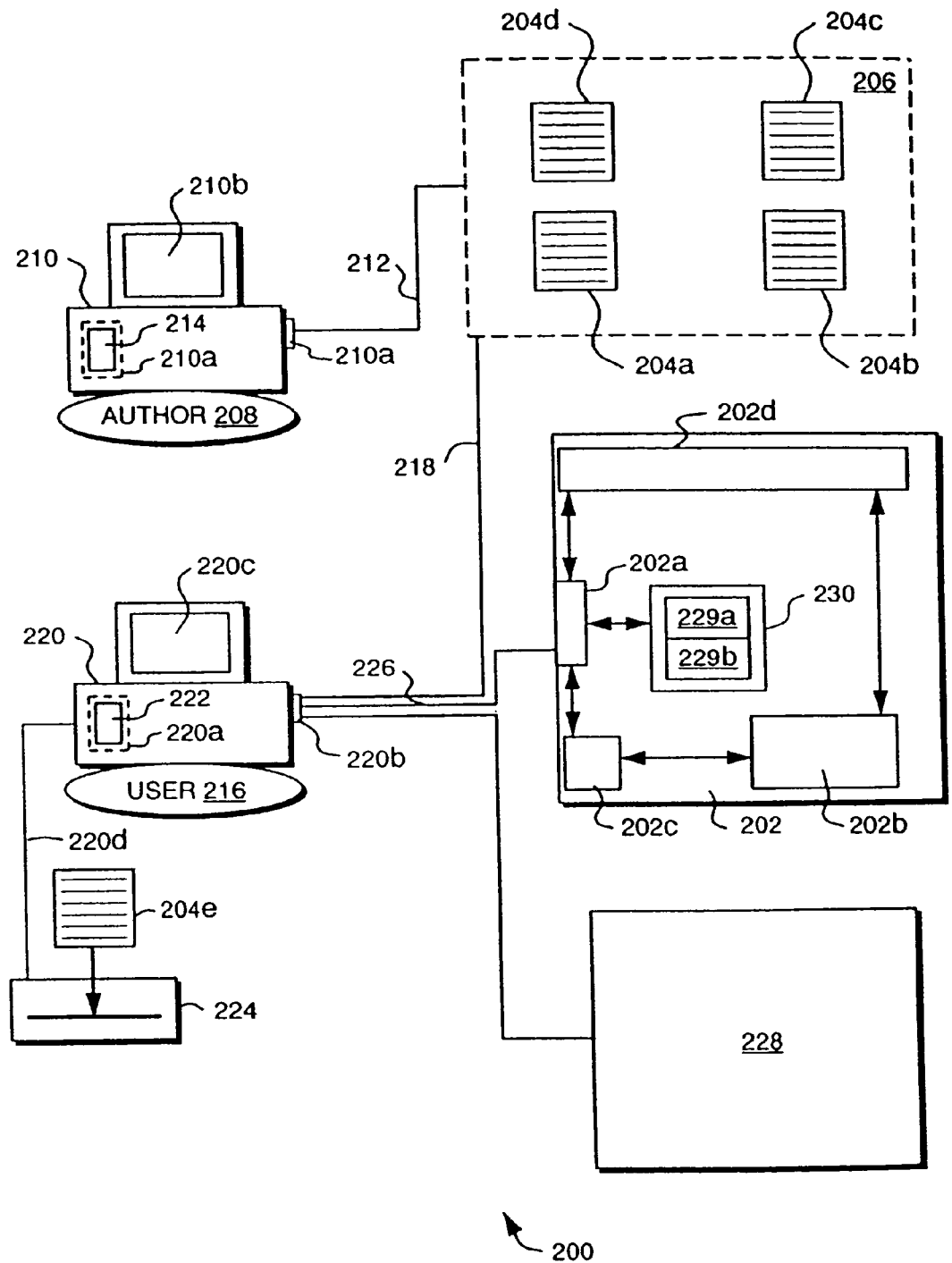
FIG. 9 schematically shows a system, constructed according to the invention, and which illustrates selective operations of a VIEWER, PACKAGER and registration/authorization server.

FIG. 9 illustrates a system 200 constructed according to the invention. The system 200 includes a server 202 which operates as a registration and authorization server for any of the DOCUMENTs 204a, 204b, 204c, and 204d stored in a library 206. By way of example, the library 206 can be a publisher's library of any or all of the original works owned by or authored for the publisher. Author 208, for example, illustrates one such author connected to the library 206 through a personal computer 210 and communication line 212. The computer 210 is a data processor that includes a PACKAGER 214 constructed according to the invention and as described hereinabove. In the preferred embodiment, the PACKAGER 214 is a software module stored within the computer's internal memory 210a to control the data processor's actions in accord with the invention. Through the PACKAGER 214, the author 208 can create and package any of the DOCUMENTs 204. The computer 210 also includes a communication section 210b, to facilitate on-line communications, and a computer display 210c.

The DOCUMENTs 204 are secure containers of electronic media, as described herein, and are stored in the library 206 as digital files, such as within a CD-ROM, or within a computer memory. Preferably, the DOCUMENTs are stored such that a user such as User 216 can access the DOCUMENTs through an on-line connection 218 between the user's personal computer 220 and the library 206.

The owner of the library 206 may also have copyrights in DOCUMENTs such as DOCUMENT 204e, which represents a CD-ROM of a media-packaged work that is distributed to the User 216 by mail. The CD-ROM 204e, for example, exemplifies one other published work that is created by the author 208 and packaged by the PACKAGER 214. As above, the server 202 also functions as the registration and authorization server for DOCUMENT 204e.

In accord with the invention, the user's computer 220 is a data processor that includes a VIEWER 222 constructed according to the invention and as described hereinabove. In the preferred embodiment, the VIEWER 222 is a software module stored within the computer's internal memory 220a to control the data processor's actions in accord with the invention. A CD-ROM 224 drive is preferably connected to the user's computer 220 via data line 220d to facilitate access to CD-ROM files such as DOCUMENT 204e.

Through the VIEWER 222, User 216 can access any of the DOCUMENTs 204a-e up to the minimum permissions authorized by each of the DOCUMENTs. By way of example, the minimum permissions data set within each DOCUMENT typically authorizes the User 216 to view the DOCUMENTs 204a-e; but not to download, modify, save or otherwise electronically transfer the DOCUMENTs. The data transfers required to access the DOCUMENTs 204a-d up to the minimum permissions data set occur through communication line 218; while the only data transfers required to access the DOCUMENT 204e up to its minimum permissions data set are between the computer 220 and the CD-ROM drive 224.

If the User 216 wishes to augment the authorizations to any of the DOCUMENTs 204, for example to modify or save the DOCUMENT at the computer 220, she must communicate with the server 202 and transact a license with that server. The data processor 220 thus includes a communication section 220b that is connected for data transfers, over communication line 226, with a compatible communication section 202a of the server 202. Upon selection by the User 216, the VIEWER 222 determines from the selected DOCUMENT 204 that authorization server 202 is assigned to handle all licenses to that DOCUMENT, and the VIEWER controls the computer 220 to connect to the server 202 at the right address so that an on-line licensing transaction can occur.

Specifically, once the user 216 indicates that additional permissions to the DOCUMENT 204 are desired, the VIEWER can display selected terms to the DOCUMENT, as stored within the DOCUMENT or as stored within the server 202. In either case, the VIEWER causes the computer 220 to generate a licensing request signal and issue that signal to the server 202. Preferably, the user 216 also designates—through the VIEWER—the desired use of the media within the DOCUMENT. The user 216 can thereafter accept the licensing terms to the DOCUMENT 204, and, if accepted, the user 216 receives notification from the server 202 that auxiliary permissions are granted for the desired use.

In the event that DOCUMENT 204 is a derivative work, the VIEWER 222 determines that auxiliary permissions are also required, for example, from server 228, the server designated by the original author of the media within DOCUMENT 204.

The server 202 stores transactional information about the DOCUMENTs 204. For example, each license transacted through the server 202 is stored in a file 229a, such as within a computer memory 230. In this way, the owner or administrator of the DOCUMENTs can assess the licensing fees generated by the DOCUMENTs. Likewise, the server 202 also stores information or files 229b that set forth the number of DOCUMENTs registered thereon, so that, again, the owner or DOCUMENT-administrator can assess server usage. The files 229a, 229b are preferably available through the communication section 202a.

In one embodiment of the invention, the server 202 includes an internal memory 202b, connected to the communication section 202a, that stores selected information about the DOCUMENTs registered thereon. For example, licensing terms to the DOCUMENT 204 can be stored within the memory 202b. A relay section 202c operates to relay such terms to the processor 220 in response to a license request signal prompted by the user 216. A data comparison section 220d operates to compare the user's reply to the licensing terms, and to generate and transmit the requested auxiliary permissions when the response signals correspond to the requisite terms specified in the license information stored in memory 202b (or alternatively in the DOCUMENT). Accordingly, once the user 216 receives the auxiliary permissions, that user is provided with additional authorizations to use the media within the DOCUMENT 204; and the VIEWER 222 enables the user 216 to access the DOCUMENT 204 up to the maximums allowed in the bumped-up permissions data set.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

I claim:

1. A method for managing copyrighted electronic media, comprising:

formatting the media into a secure electronic container, the container including a digital representation of the media and a minimum permissions data set specifying the minimum authorized use of the media;

registering the electronic media on a server and assigning a registration identifier to the container, the server being connected for on-line data transfers with at least one computer;

providing licensing terms to the computer in response to a request to license the media; and augmenting the permissions data set with auxiliary permissions when the computer indicates acceptance of the terms, the auxiliary permissions providing authorization to utilize the media beyond what is authorized in the minimum permissions data set.

2. A method according to claim 1, further comprising determining whether the computer's use of the media is authorized by the permissions data set.

3. A method according to claim 1, further comprising enabling limited use of the media at the computer, the limited use corresponding to the minimum permissions data set.

4. A method according to claim 1, further comprising verifying that a user of the computer is an authorized user, the step of verifying occurring before the computer requests a license.

5. A method according to claim 4, wherein the step of verifying includes the step of searching for the user's public key with a certification stamp from a certification authority.

6. A method according to claim 1, wherein the step of formatting the media further comprises the step of including sourceworks extensions within the container, the sourceworks extensions providing a bibliographic record of the media.

7. A method for protecting electronic media, comprising:

packaging the electronic media within a secure electronic container by (i) attaching a data identifier to the media, and (ii) attaching data specifying minimum permissions required to use the media;

registering the container on a server connected for data transfer with at least one data processor; and transferring auxiliary permissions to the data processor upon acceptance of licensing terms associated with the media.

8. A method according to claim 7, wherein the step of packaging the media includes the step of encrypting the media.

9. A method according to claim 7, further comprising the transferring the container to the data processor via one of point-to-point email, CD-ROM, ftp, gopher, smtp, and http.

10. A method according to claim 7, further comprising communicating with the data processor in accord with TCP/IP protocol.

11. A method according to claim 7, further comprising affixing an encrypted digital signature to the media, the signature corresponding to a registration of the media to provide authentication to the media.

* * * * *